United States Patent
Abu-Omar

(10) Patent No.: US 7,700,072 B2
(45) Date of Patent: Apr. 20, 2010

(54) CATALYTIC HYDROGEN PRODUCTION FROM HYDROLYTIC OXIDATION OF ORGANOSILANES

(75) Inventor: Mahdi M. Abu-Omar, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 559 days.

(21) Appl. No.: 11/462,760

(22) Filed: Aug. 7, 2006

(65) Prior Publication Data

US 2008/0267859 A1    Oct. 30, 2008

Related U.S. Application Data

(60) Provisional application No. 60/710,666, filed on Aug. 23, 2005.

(51) Int. Cl.
*C01B 3/00* (2006.01)
*C01B 3/08* (2006.01)
*C01B 33/04* (2006.01)

(52) U.S. Cl. ............... 423/658.2; 423/347; 423/657

(58) Field of Classification Search ........... 423/657, 423/658.2, 347
See application file for complete search history.

(56) References Cited

U.S. PATENT DOCUMENTS 5,162,397 A * 11/1992 Descamps et al. ........... 523/219

OTHER PUBLICATIONS

Arias, Joachin et al., Kinetics and Mechanisms of Catalytic Oxygen Atom Transfer with Oxorhenium(V) Oxazoline Complexes, 2000, Inorganic Chemistry, 40, pp. 2185-2192.*

Owens, Gregory et al., Rhenium oxo complexes in catalytic oxidations, 2000, Catalysis Today, 55, pp. 317-363.*

Ison, at al., Hydrogen Production from Hydrolytic Oxidation of Organosllanes Using a Cationic Oxorhenium Catalyst, J. Am. Chem. Soc. 2005, vol. 127, pp. 11938-11939.

Ison, et al., Hydrogen Production from Hydrolytic Oxidation of Organosilanes Using a Cationic Oxorhenium Catalyst, supporting information.

McPherson, et al., Oxorhenium(V) Oxazoline Complexes for Oxygen Atom Transfer, Inorg. Synth., 2004, vol. 34, pp. 54-59.

Ison, et al., Synthesis of Cationic Oxorhenium Salen Complexes via μ-Oxo Abstraction and Their Activity in Catalytic Reductions, Inorganic Chemistry, vol. 45, 2006, pp. 2385-2387.

Du, et al., Catalytic Hydrosilylation of Carbonyl Compounds with Cationic Oxorhenium(V) Salen, Organometallics, 2006, vol. 25, pp. 4920-4923, lines 6-9, paragraph 7 on p. 4921; p. 4922, mechanism Scheme 2.

(Continued)

*Primary Examiner*—Jerry Lorengo
*Assistant Examiner*—Kevin M Johnson
(74) *Attorney, Agent, or Firm*—Bose McKinney & Evans

(57) ABSTRACT

A novel application of a transition metal oxo complex, a cationic oxorhenium(V) oxazoline, in the production of molecular hydrogen ($H_2$) from the catalytic hydrolytic oxidation of organosilanes. The reaction is characterized by quantitative hydrogen yields, low catalyst loading, ambient conditions, high selectivity for silanols, water as the only co-reagent, and no solvent requirement. The amount of hydrogen produced is proportional to the water stoichiometry. For example, reaction mixtures of polysilyl organics such as $HC(SiH_3)_3$ and water contain potentially greater than 6 weight percent hydrogen. Kinetic and isotope labeling experiments reveal a new mechanistic paradigm for the activation of Si—H bonds by oxometalates.

29 Claims, 16 Drawing Sheets

OTHER PUBLICATIONS

Lee, et al., Highly Efficient Iridium-Catalyzed Oxidation of Organosilanes to Silanols, J. Org. Chem. 2004, vol. 69, pp. 1741-1743.

Mori, et al., Efficient heterogeneous oxidation of organosilanes to silanols catalysed by a hydroxyapatite-bound Ru complex in the present of water and molecular oxygen, New J. Chem, 2002, vol. 26, pp. 1536-1538.

Luo, et al., Homogeneous Catalysis of Silane Alcoholysis via Nucleophilic Attack by the Alcohol on an $Ir(\eta2-HSiR_3)$ Intermediate Catalyzed by $[IrH_2S_2(PPh_3)_2]SbF_6$ (S=Solvent), J. Am. Chem. Soc. 1989, vol. 111, pp. 2527-2535.

Field, et al., Cationic Iridium(I) Complexes as Catalysts for the Alcoholysis of Silanes, Organometallics 2003, vol. 22, pp. 2387-2395.

Schubert, et al., Conversion of Hydrosilanes to Silanols and Silyl Esters Catalyzed by $[Ph_3PCuH]_6$, Inorg. Chem., 1997, vol. 36, pp. 1258-1259.

Blackweli, et al., $B(C_6F_5)_3$-Catalyzed Silation of Alcohols: A Mild, General Method for Synthesis of Silyl Ethers J. Org. Chem, 1999, vol. 64, pp. 4887-4892.

Schmidbaur, et al., Molecular Structure of Trisilylmethane and Synthesis of 1,1,1-Trisilylethane, Chem. Ber., 1991, vol. 124, pp. 1953-1956.

Schmidbaur, et al., Synthetic Pathways to Simple Di- and Trisitylmethanes: Potential Starting Materials for the CBD Deposition of Amorphous Silicon a-SIC:H, Z. Naturforsch, 1986, vol. 41b, pp. 1527-1534.

Bommers, et al., Poly(trifluoromethansulfonatosilyl)methanes—Precursors to Polysilylmethanes, Z. Naturforsch, 1993, vol. 49b, pp. 337-339.

Hager, et al., Tetresilylmethane, $C(SiH_3)_4$, the Si/C-Inverse of Tetramethylsilane, $Si(CH_3)_4$, Chem. Int. Ed. Engl., 1990, vol. 29, No. 2, pp. 201-203.

Rüdinger, et. al., Synthesis and Molecular Structure of Silylated Ethenes and Acetylenes, Z. Naturforsch, 1994, vol. 49b, pp. 1348-1360.

Rüdinger, et. al., Hexasilyibenzene, $C_6(SiH_3)_6$, Chem. Ber., 1992, vol. 125, pp. 1401-1403.

Oman, Henry, New Applications for Fuel Cells, Conference Report published in IEEE AES Systems Magazine, 1999, pp. 15-22, Fig. 6, p. 18.

Matthews, et al., Silane Complexes of Electrophilic Metal Centers, Inorganic Chemistry, 2006, vol. 45, No. 16, pp. 6453-6459 (an example of silane adducts of electrophilic metals), p. 6454, bottom of col. 7 and Top of col. 2 (the rhenium example).

Adam, et al., Host-Guest Chemistry in a Urea Matrix: Catalytic and Selective Oxidation of Triorganosilanes to the Corresponding Silanols by Methyltrioxorhenium and the Urea/Hyrdogen Peroxide Adduct, J. Am. Chem. Soc., 1999, col. 121, pp. 2097-2103.

Tan, et al., Experimental and Theoretical Study of Oxygen Insertion into Trialkylsilenes by Methyltrioxorhenium Catalyst, Organometallics, 1999, vol. 18, pp. 4753-4757.

Fakioğlu, et al., A review of hydrogen storage systems based on boron and its compounds, Int. J. Hydrogen Energy, 2004, vol. 29, pp. 1371-1376.

Amendola, et al., A safe, portable, hydrogen gas generator using aqueous borohydride solution and Ru catalyst, Int. J. Hydrogen Energy, 2000, vol. 25, pp. 969-975.

T-Rossi, et al., Hydrogen: Automotive Fuel of the Future, IEEE Power & Energy, Nov.-Dec. 2004, pp. 40-45.

McPherson, et al., Multielectron Atom Transfer Reactions of Perchlorate and Other Substrates Catalyzed by Rhenium Oxazoline and Thiazoline Complexes: Reaction Kinetics, Mechanisms, and Density Functional Theory M. Inorganic Chemistry, 2004, vol. 43, p. 4036-4050.

Kennedy-Smith, Reversing the Role of the Metal-Oxygen π-Bond, Chemoselective Catalytic Reductions with a Rhenium(V)-Dioxo Complex, et al., J. Am. Chem. Soc., 2003, vol. 125, pp. 4056-4057.

Sweeney, et al., Synthesis, Structure, and Reactivity of Monomeric Titanocene Sulfide and Disulfide Complexes. Reaction of $H_2$ with a Terminal M=S Bond, J. Am. Chem. Soc., 1997, vol. 119, pp. 4543-4544.

Gountchev, et al., Structure and Reactivity of Chelating Imido-Amido Complexes of Tantalum. Mechanistic Studies on the Addition of Silanes to Ta-N Multiple Bonds, J. Am. Chem. Soc. 1997, vol. 119, p. 12831.

Service, R.F., The Hydrogen Backlack, Special issue "Toward a Hydrogen Economy", Science, 2004, vol. 305, pp. 958-961.

Dybtsev, et al., Microporous Manganese Formate: A Simple Metal-Organic Porous Material with High Framework Stability and Highly Selective Gas Sorption Properties, J. Am. Chem. Soc., 2004, vol. 126, p. 32.

Baney, R. H., et al., Silsesquioxanes, T. *Chem. Rev.* 1995, vol. 95, 1409-1430.

Loy, D.A., et al., Bridged Polysilsesquioxanes. Highly Porous Hybrid Organic-Inorganic Materials, *Chem. Rev. 1995*, vol. 95, 1431-1442.

Glaser, et al., Catalytic Hydrosilylation of Alkenes by a Ruthenium Silylene Complex. Evidence for a New Hydrosilylation Mechanism., J. Am. Chern. Soc., 2003, vol. 125, p. 13640-13641.

GE Moves in Silicon Field, Chem. Eng. News, 2005, vol. 83, p. 14.

\* cited by examiner

CATALYTIC HYDROGEN PRODUCTION FROM HYDROLYTIC OXIDATION OF ORGANOSILANES

RELATED APPLICATIONS

This application claims priority to U.S. Provisional Application Ser. No. 60/710,666 filed Aug. 23, 2005.

BACKGROUND

The present invention generally relates to processes for producing hydrogen and more particularly to producing catalytic and recyclable hydrogen ($H_2$) by oxidizing organic silanes.

Renewable energy sources have been sought for decades to replace fossil fuels. The interest in hydrogen utilization as a fuel has intensified recently because its use in fuel cells produces water and heat as the only byproducts. Currently, the most efficient method for obtaining hydrogen involves the combustion of methane and other hydrocarbons; however, these energy sources are nonrenewable in nature. While finding an inexpensive and renewable source of hydrogen poses a significant scientific challenge, moving toward a hydrogen-based economy requires that the problems associated with hydrogen storage, transport, and delivery be addressed. If hydrogen fuel cells are to become commonplace, it would be desirable to develop a practical process for handling the on-board storage and delivery of hydrogen to fuel cells. None of the currently available hydrogen storage options, viz., liquefied or high-pressure $H_2$ gas, metal hydrides, etc., satisfies criteria of size, cost, kinetics, and safety for use in transportation.

SUMMARY OF THE INVENTION

The present invention provides a method for the production of hydrogen on demand and under kinetic control from organic liquid, using only water as co-reagent. The inventive method represents a new paradigm for the use of high-valent oxometalate catalysts in dehydrogenative oxidations with water. In exemplary embodiments, hydrogen gas is produced under ambient conditions from catalytic hydrolytic oxidation of organosilanes using an oxorhenium(V) oxazoline coordination complex. It has been found that the yield of hydrogen is proportional to the water stoichiometry. Advantageously, the costs of the organosilanes used in the method can be offset by efficiently recycling the valuable organic silicon byproducts produced in the inventive method.

BRIEF DESCRIPTION OF DRAWINGS

The above-mentioned aspects of the present invention and the manner of obtaining them will become more apparent and the invention itself will be better understood by reference to the following description of the embodiments of the invention taken in conjunction with the accompanying drawings, wherein.

DETAILED DESCRIPTION

Figure 1:
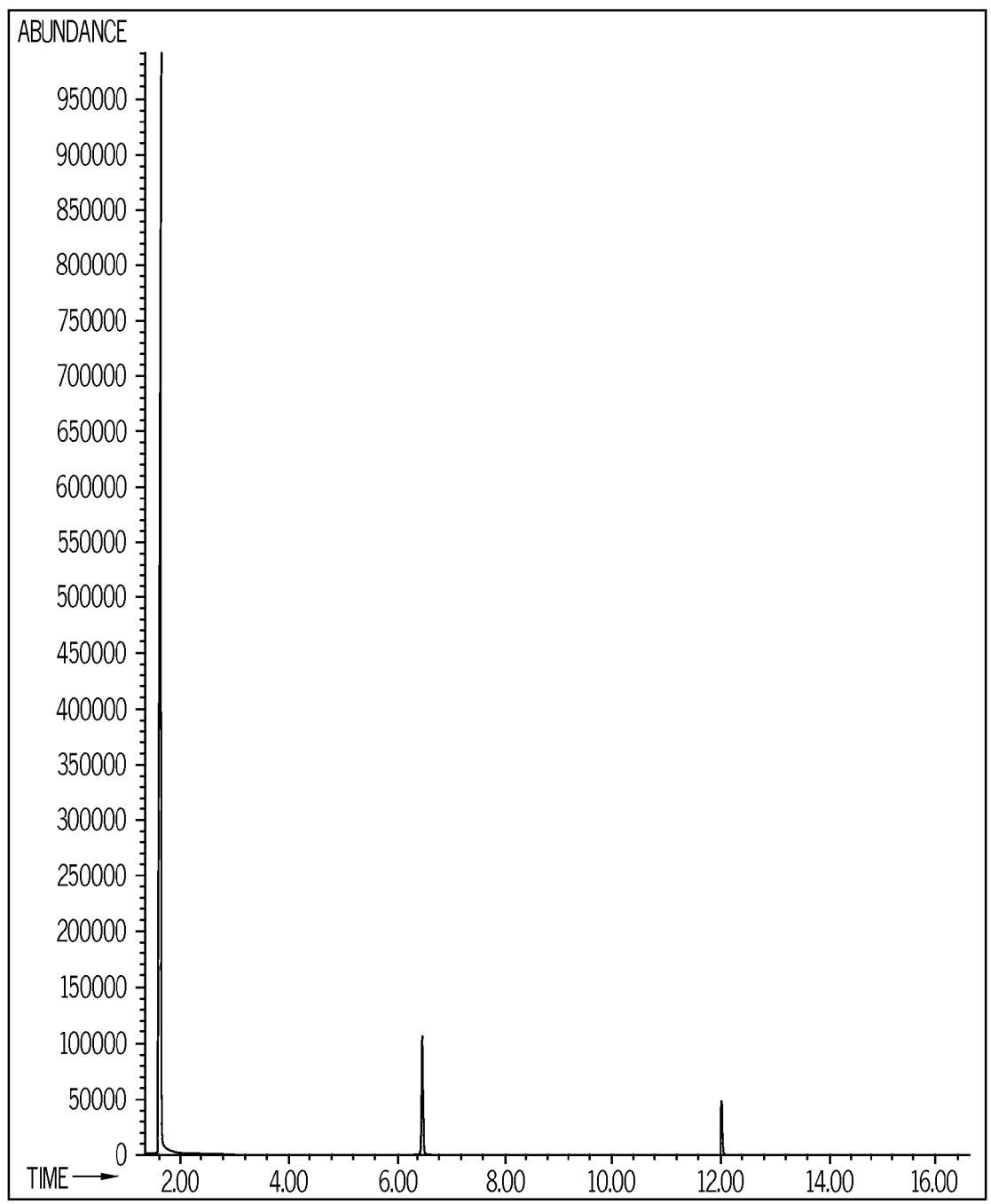
FIG. 1 is a chromatogram of an aliquot sample analyzed under GC/MS procedures in accordance with the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present disclosure relates to processes for producing (on demand) catalytic and recyclable hydrogen ($H_2$) from the hydrolytic oxidation of organic silanes. In one exemplary embodiment, a cationic oxorhenium(V) oxazoline complex catalyzes the production of hydrogen from a reaction of organosilanes and water. (See formula 1 listed below). According to this embodiment, the reaction utilizes about 0.1 to about 5 mol % of catalyst and is conducted in an organic solvent, such as, but not limited to acetonitrile, benzene and dichloromethane and is not sensitive to moisture or air. While a solvent is used according to this exemplary embodiment, those skilled in the art will appreciate that the reactions can also be run neat, in the absence of solvent.

The organic byproduct produced according to formula 1, below, is silanol, and the reaction is slightly exothermic and capable of being completed in a matter of minutes under ambient conditions.

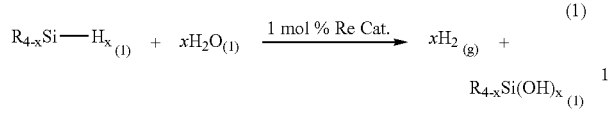

(1)

x = 1, 2, or 3
R = alkyl or aryl
Re Cat. = Rhenium Catalyst = [Re(O)(hoz)$_2$]$^+$/B(C$_6$F$_5$)$^-_4$ or other anion
hoz = 2-(2'-hydroxyphenyl)-2-oxazoline (-) (see Re Cat structure below)

The Rhenium Catalyst can be prepared from the chloride precursor, Re(O)(hoz)$_2$Cl via halide abstraction by the sylilium cation Et$_3$Si$^+$ (Et is used to signify an ethyl group) produced from the reaction of silane (Et$_3$SiH) and [Ph$_3$C][B(C$_6$F$_5$)$_4$] (Ph is used to signify a phenyl group). This synthetic strategy is convenient because it allows in situ generation of the active catalyst from the precursor. The precursor is stable for years under ambient conditions. Alternatively, the Rhenium Catalyst may be prepared in advance, ex situ. The structure of the Rhenium Catalyst is shown below:

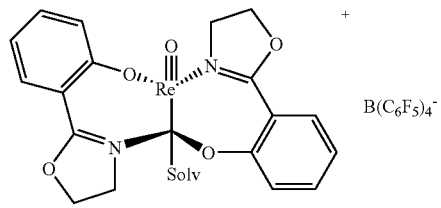

B(C$_6$F$_5$)$_4^-$

Although reference is made to "the Rhenium Catalyst" listed above, one of skill in the art would appreciate that variations of the Rhenium catalyst are possible. For example, the phenoxide and/or oxazoline ligand may include alkyl, aryl or halide, etc. substituents. Further, instead of the phenoxide and oxazoline components in the Rhenium catalyst of the above formula, the ligand can be in the form of bisoxazoline and diamidato ligands. Schiff base ligands (salen-type ligands), bidentate as well as tetradentate, are also possible and examples of these are as follows:

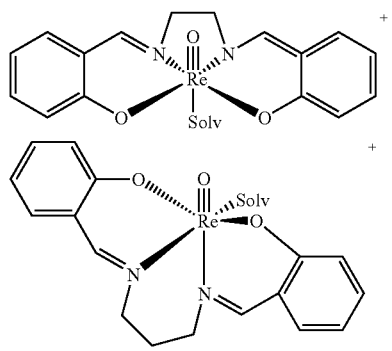

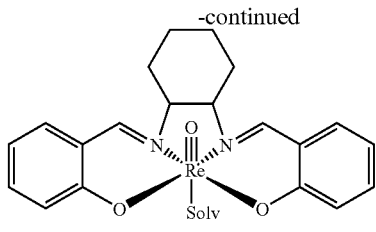

See Ison, J. E. Cessarich, G. Du, P. E. Fanwick, and M. M. Abu-Omar Inorg. Chem. 2006, 45, 2385-2387). Further, the phenoxide ring of the above Schiff base ligands may include alkyl, aryl or halide, etc. substituents, the bridge may include substituents, and the bridge itself may be varied (e.g., ethyl, propyl, butyl, cyclolhexyl, etc.). Also, one of skill in the art would readily appreciate many variations that may be made to the anion or solvent coordinated molecule. Finally, it has recently been found that catalyst loading can be as little as 0.01 mol %.

Without wishing to be tied to any specific theory, the described catalytic reaction (see equation 1, above) could be regarded as a "splitting" of water in the stoichiometric sense with organosilane providing the needed energy by forming a Si—O bond: H$_2$O→[O]+H$_2$. The oxygen atom in brackets, [O], denotes its transfer to silicon, which circumvents the uphill oxygen evolution problem.

In another exemplary embodiment, the water component described herein can be replaced with an alcohol component such as ethanol, methanol, or phenol. According to this embodiment, the product from the reaction would produce a stable silylether liquid. See formula 1a listed below. According to this embodiment, the reaction utilizes about 0.1 to about 1 mol % of catalyst and is conducted in an organic solvent, such as, but not limited to acetonitrile and is not sensitive to air. While a solvent is used according to this exemplary embodiment, those skilled in the relevant art will appreciate that the reactions described can also be run neat, in the absence of solvent.

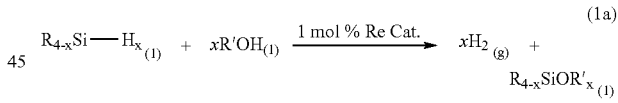

(1a)

x = 1, 2, or 3
R and R' = alkyl or aryl
Re Cat. = [Re(O)(hox)$_2$]$^+$/B(C$_6$F$_5$)$^-_4$ or other anion
hoz = 2-(2'-hydroxyphenyl)-2-oxazoline (-) (see Re Cat structure below)

In yet another exemplary embodiment, secondary (R$_2$SiH$_2$) and primary (RSiH$_3$) silanes are utilized to produce silanediol (R$_2$Si(OH)$_2$) and silanetriol (RSi(OH)$_3$), respectively, and increase the yield of hydrogen per silane equivalent relevant to tertiary silanes. As is appreciated by those of ordinary skill within the relevant art, both silanediols (R$_2$Si(OH)$_2$) and silanetriols (RSi(OH)$_3$) are valuable by-products that may be used for making silicone polymers, among other things.

One relevant difference between tertiary (R$_3$SiH), secondary (R$_2$SiH$_2$), and primary (RSiH$_3$) silanes is the number of hydrogen atoms in the molecule. Each hydrogen atom provides a potential location for hydrolytic oxidation, and each hydrolytic oxidation reaction produces one molecule of H$_2$ gas. Therefore secondary silanes, which have 2 hydrogen atoms, and primary silanes, which have 3 hydrogen atoms, have the capacity to generate more hydrogen gas per silane molecule than tertiary silanes, which have only 1 hydrogen atom. The total volume of reactants required is important to the portability of the fuel, and therefore to the utility of the system in mobile applications, such as hydrogen fuel cells for automobiles. The different amounts of silane required to produce 3.0 kg $H_2$ using tertiary, secondary, primary and polysilyl silanes illustrated below for four reactions, equations 2-5. Three (3.0) kg of $H_2$ represents a benchmark quantity for storage in automotive applications. See T-Raissi, A.; Block, D. L. "Hydrogen: Automotive Fuel of the Future," *IEEE Power & Energy*, November-December 2004. pg. 40-45.

$$Et_3SiH + H_2O \rightarrow Et_3Si(OH) + H_2 \quad (2)$$

To produce 3.0 kg $H_2$ (1488 moles), 173 kg (238 L or 63 gal) of $Et_3SiH$ and 27 kg (27 L or 7 gal) of water are needed.

$$Et_2SiH_2 + 2H_2O \rightarrow Et_2Si(OH)_2 + 2H_2 \quad (3)$$

By utilizing a secondary silane and producing silanediol, 2 equivalents of $H_2$ per equivalent silane are produced, wherein the water molar ratio to hydrogen is constant. The molar mass of $Et_2SiH_2$ is 88.22 g mol$^{-1}$ and its density is 0.6837 g mL$^{-1}$. Therefore, to produce 3.0 kg $H_2$, 66 kg (96 L or 25 gal) of $Et_2SiH_2$ and 7 gal of water are needed. According to this embodiment, the total liquid is only 32 gal.

$$PhSiH_3 + 3H_2O \rightarrow PhSi(OH)_3 + 3H_2 \quad (4)$$

With phenyl silane or other primary silanes, 3 equivalents of $H_2$ are produced per equivalent silane. Thus, to get 3.0 kg $H_2$, only 54 kg (62 L or 16 gal) of $PhSiH_3$ and 7 gal of water are needed. A total of only 23 gal of liquid ($PhSiH_3$ plus water) is needed to yield 3.0 kg of $H_2$.

$$HC(SiH_3)_3 + 9H_2O \rightarrow HC(Si(OH)_3)_3 + 9H_2 \quad (5)$$

With polysilyl silanes, 9 equivalents of $H_2$ are produced per equivalent silane. Thus, to get 3.0 kg $H_2$, only 18 kg (21 L) of $HC(SiH_3)_3$ and 27 L of water are needed.

Some silyl ether is produced as a side product with triethylsilane. The source of the silyl ether is the silanol, which is known to condense to the ether, as shown in equation 6, below. This latter reaction is catalyzed by the rhenium catalyst. If the catalytic reaction is allowed to stand, the bulk of the silanol converts to the ether. The net stoichiometric reaction is thus described by equation 7, below.

$$2Et_3Si(OH) \rightarrow Et_3SiOSiEt_3 + H_2O \quad (6)$$

$$2Et_3SiH + H_2O \rightarrow Et_3SiOSiEt_3 + 2H_2 \quad (7)$$

TABLE 1

Rhenium-Catalyzed Production of Hydrogen from Organosilane

| entry | substrate | method[a] | % yield[b] | | |
|---|---|---|---|---|---|
| | | | $H_2$ | —SiOH | —SiOSi— |
| 1 | $Ph_2MeSiH$ | A | 94 | 100 | 0 |
| | | B | 98 | 100 | 0 |
| 2 | $PhMe_2SiH$ | B[c] | 78 | (88)[d] | — |
| | | C | 95 | — | (70) |
| 3 | $Et_3SiH$ | A | 97 | 92 | 8 |
| 4 | $Et_2SiH_2$ | A | 72 | n.d.[e] | n.d. |

TABLE 1-continued

Rhenium-Catalyzed Production of Hydrogen from Organosilane

| entry | substrate | method[a] | % yield[b] | | |
|---|---|---|---|---|---|
| | | | $H_2$ | —SiOH | —SiOSi— |
| 5 | $Ph_2SiH_2$ | A | 82 | 100[f] | 0 |
| | | B | 88 | 100[f] | 0 |
| 6 | $PhSiH_3$ | A | 66 | g | g |

[a]Method A: 1 mol % 2/[$Ph_3C$][$B(C_6F_5)_4$], 1.0 M silane substrate, 2.0-10.0 equiv of $H_2O$ in $CH_3CN$ at 20° C. Method B: 1 mol % 1 (isolated catalyst), 1.0 M silane substrate. 2.0-10.0 equiv of $H_2O$ in $CH_3CN$ at 20° C. Method C: Neat as a biphasic reaction without solvent; same conditions as method B.
[b]Isolated yields for silicon products are reported in parentheses; otherwise, silanol and silyl ether product yields were determined by $^{29}Si$ NMR.
[c]0.1 mol % catalyst 1.
[d]95:5 $PhMe_2Si(OH)/(PhMe_2Si)_2O$.
[e]n.d. = not determined.
[f]26% $Ph_2SiH(OH)$ and 74% $Ph_2Si(OH)_2$.
[g]Multiple silicon containing products result.

Table 1, above, summarizes the representative yields of hydrogen for different organosilanes. The catalytic reactions were carried out at ambient temperature with 1 mol % catalyst loading or less. Reactions reach completion (100% conversion) in less than one hour and give silanol selectively. Even though acetonitrile is used as solvent to maintain homogenous conditions, the reaction proceeds smoothly in the absence of a solvent (see entry 2 in Table 1). Once hydrogen evolution ceases, the initial silicon product is silanol (see FIG. 10), which condenses over time to the silyl ether. However, when the reaction is run neat, the silicon product is silyl ether (see entry 2 in Table 1). Since water inhibits silanol condensation to silyl ether, biphasic conditions reduce the effective concentration of water in the organic phase, resulting in silyl ether. In the case of primary silanes, the initially formed silanol condenses to oligomeric/polymeric siloxanes. See Baney, R. H.; Itoh, M.; Sakakibara, A.; Suzuki, T. *Chem. Rev.* 1995, vol. 95, page 1409; and Loy, D. A.; Shea, K. J., *Chem. Rev.* 1995, vol. 95, page 1431. It is worth noting that while secondary silanes afford nearly 2 equivalents of $H_2$ per silane, primary silanes do not afford the expected 3 equivalents of $H_2$ (compare entries 5 and 6 in Table 1). Once silanediol is generated, the reactivity of the remaining Si—H bond is reduced.

Under steady-state conditions, the major catalyst species is the Rhenium Catalyst depicted above (per UV-vis and ESI-MS). When this catalyst is reacted with organosilane in the absence of water, the solution turns red with production of stoichiometric (relative to Re) amounts of hydrogen and silyl ether. See Equation 8, below.

$$[Re(O)(hoz)_2]^+ + 2Et_3SiH \xrightarrow{Ar} H_2 + (Et_3Si)_2O + [Re(hoz)_2(CH_3CN)_x]^+ \quad (8)$$

hoz = 2-(2'-hydroxyphenyl)-2-oxazoline(-)

The reduced red rhenium(III) complex is not believed catalytically relevant. Addition of water and/or air in the presence of excess organosilane does not ensure catalysis. Furthermore, the rate of reduction of catalyst is slower than the rate of the catalytic reaction. Surprisingly, it has been found that other simple oxorhenium complexes such as $Re(O)Cl_3(PPh_3)_2$, $CH_3ReO_3$ (MTO), $[NH_4]ReO_4$, and $Re(O)_2I(PPh_3)_2$ do not catalyze the hydrolytic oxidation of organosilanes. The latter complex is of particular interest because it has been shown to effect hydrosilation of organic carbonyl compounds. See Kennedy-Smith, J. J.; Nolin, K. A.; Gunterman, H. P.; Toste, F. D. *J. Am. Chem. Soc.* 2003, 125, 4056.

One of the advantages for hydrogen storage according to the present invention is the feasibility of recycling the ether product with dihydrogen utilizing catalytic chemistry. For example, the silylether product from the reaction of a primary silane and alcohol, $RSi(OR')_3$, can be recycled to the alcohol and the silylchloride, $RSiCl_3$, with hydrochloric acid (HCl). The silylchloride affords the starting silane, $RSiH_3$, upon reaction with lithium aluminum hydride ($LiAlH_4$). Alternatively, the silylchloride can be hydrogenated to the silane with dihydrogen and a transition metal catalyst. In the latter scenario HCl is the byproduct, making all reagents recoverable and $H_2$ and water the only consumable.

Other advantages of on-board hydrogen storage in the form of organic silanes include: (1) silanes such as thriethylsilane or phenylsilane are liquids, which translates to facile transportation; (2) catalytic $H_2$ production allows kinetic control; (3) mild conditions and absence of waste (solvent is not needed and water or alcohol is the only co-reagent); and (4) the catalyst is based on rhenium, an inexpensive metal in comparison to noble metals (Ru, Rh, and Pt) since it is a byproduct of copper and molybdenum mining, both of which being very abundant in the earth's crust.

EXAMPLES

The examples are illustrative only and are not intended to limit or preclude other embodiments of the invention. Reactions were performed in a nitrogen-filled glove-box or open to the ambient atmosphere as stated. Solvents were degassed, and distilled over $CaH_2$ prior to use. Trityl tetra(pentafluorophenyl) borate was purchased from Strem Chemicals and used as received. Organosilanes were purchased from Gelest and used as received. The oxorhenium chloride complex, $Re(O)(hoz)_2Cl$, was prepared according to published procedures. See Mcpherson, L. D.; Drees, M.; Khan, S. I.; Strassner, T.; Abu-Omar, M. M. *Inorg. Chem.* 2004, 43, 4036. $^1$NMR spectra were recorded on Varian Inova300 instruments. Mass spectrometry was performed by the Purdue University Campus Wide Mass Spectrometry Center on a FinniganMAT LCQ mass spectrometer system (ESI) or a Hewlett Packard Engine mass spectrometer (GC/MS). A commercial gas evolution apparatus (ChemGlass CG-1818) was used to determine the yields of hydrogen gas evolved. Alternatively, a customized schlenk flask featuring a side-arm vacuum Teflon valve and a threaded joint fitted with a silicone septum was used to determine $H_2$ yields. Hydrogen gas analyses were performed on a Hiden Analytical HPR20 mass-spectrometer at 70 eV ionization energy, utilizing a Faraday detector. $H_2/HD/D_2$ ratios were obtained via an empirical deconvolution table based on authentic $H_2$, HD, and $D_2$ samples (Aldrich, 98+%).

Example 1

Preparation of Rhenium Cataylst

Isolated

Trityl tetra(pentafluorophenyl) borate, (2.05 g, 2.22 mmol) was dissolved in 25 mL of $CH_3CN$ in a nitrogen-filled glove-box and treated with $PhMe_2SiH$ (0.35 mL, 2.22 mmol) to form the silylium cation $[Et_3Si(CD_3CN)][B(C_6F_5)_4]$ as a brown solution. (The "D" in $CD_3CN$ represents deuterium, a heavy or "labeled" form of hydrogen which can be used to track the movement of hydrogen between molecules during a chemical reaction.) Treatment of this solution with Re(O)$(hoz)_2Cl$, (1.25 g, 2.22 mmol) yields a green solution that contains the Rhenium Catalyst, triphenyl methane, and $PhMe_2SiCl$. The solvent was removed in vacuo and the resulting green oil was washed repeatedly with pentane, to yield the Rhenium Catalyst as a green powder in 90% yield (2.5 g). $^1$H NMR (300 MHz, $CD_3CN$), 7.93 (d, 1H, 6.8 Hz), 7.59 (t, 1H, 7.1 Hz), 7.10 (t, 1H, 7.1 Hz), 7.03 (d, 1H, 6.8 Hz). MS (ESI$^+$) m/z Calc. For $C_{18}H_{16}N_2O_5Re$: 525.06/527.06. Found 524.90/526.88. MS (ESI$^-$) m/z Calc. For $C_{24}BF_{20}$: 678.98. Found 679.14.

Example 2

Preparation of Rhenium Cataylst

In Situ

Trityl tetra(pentafluorophenyl) borate, (0.050 g, 0.053 mmol) was dissolved in 1 mL of $CD_3CN$ in a nitrogen-filled glove-box and treated with $Et_3SiH$ (8.7 µl, 0.053 mmol) to form the silylium cation $[Et_3Si(CD_3CN)][B(C_6F_5)_4]$ as a brown solution. Treatment of this solution with Re(O)(hoz)$_2$Cl, (0.030 g, 0.053 mmol) yields a green solution that contains the Rhenium Catalyst, triphenyl methane, and $Et_3SiCl$.

Example 3

Catalytic Oxidation of $Et_3SiH$ and $H_2$ Production

Figure 2:
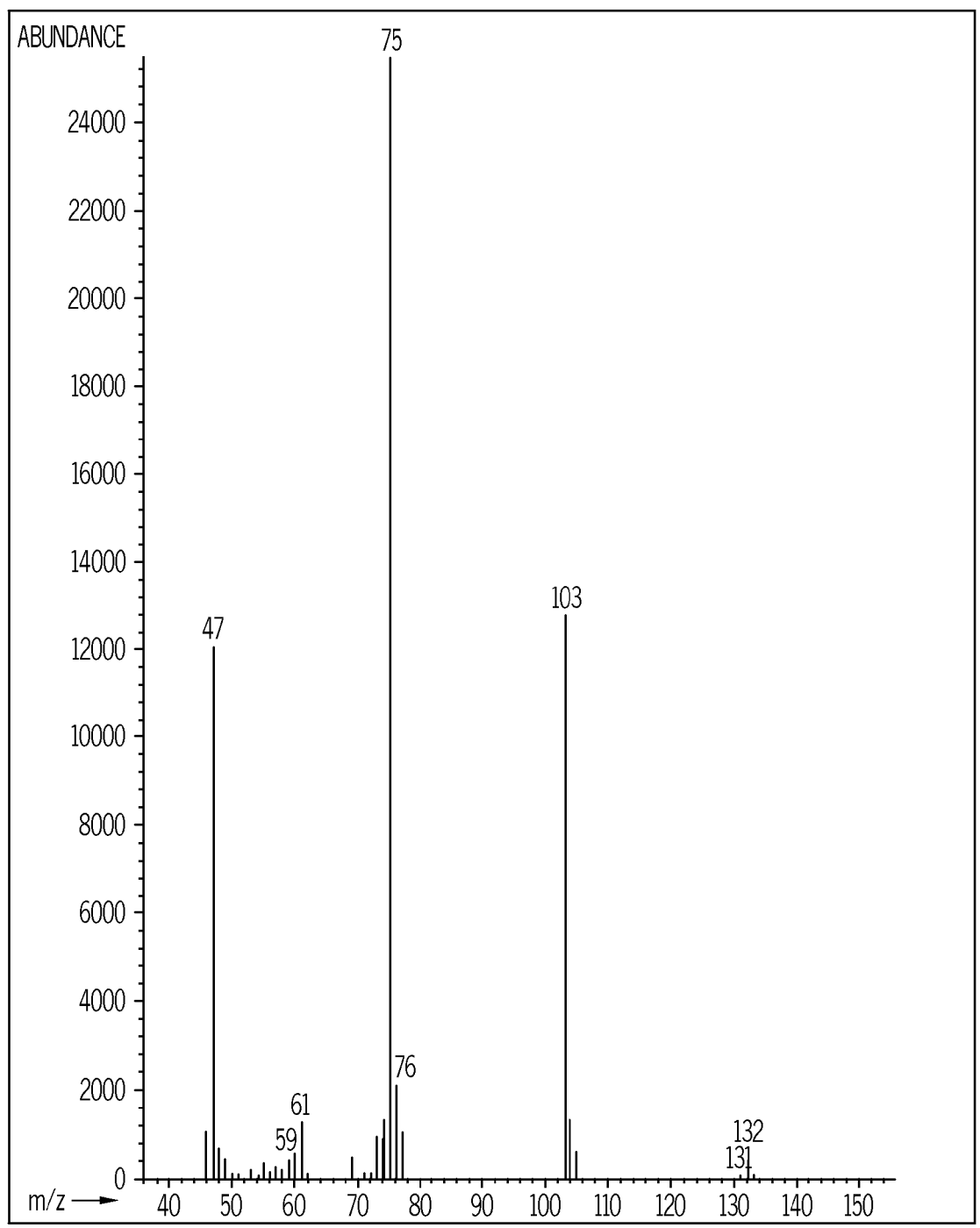
FIG. 2 is a mass spectrum of triethylsilanol obtained under GC/MS procedures in accordance with the present invention.
Figure 2A:
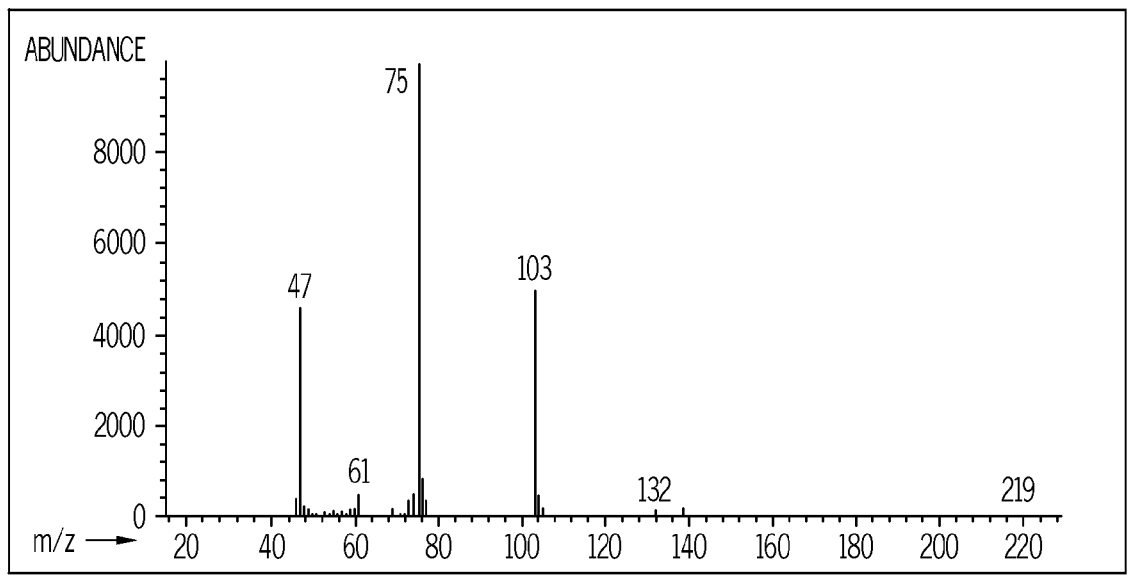
FIG. 2a is the mass spectrum of FIG. 2 reproduced in smaller scale for comparison to the library mass spectrum of triethylsilanol shown in FIG. 2b, in accordance with the present invention.
Figure 2B:
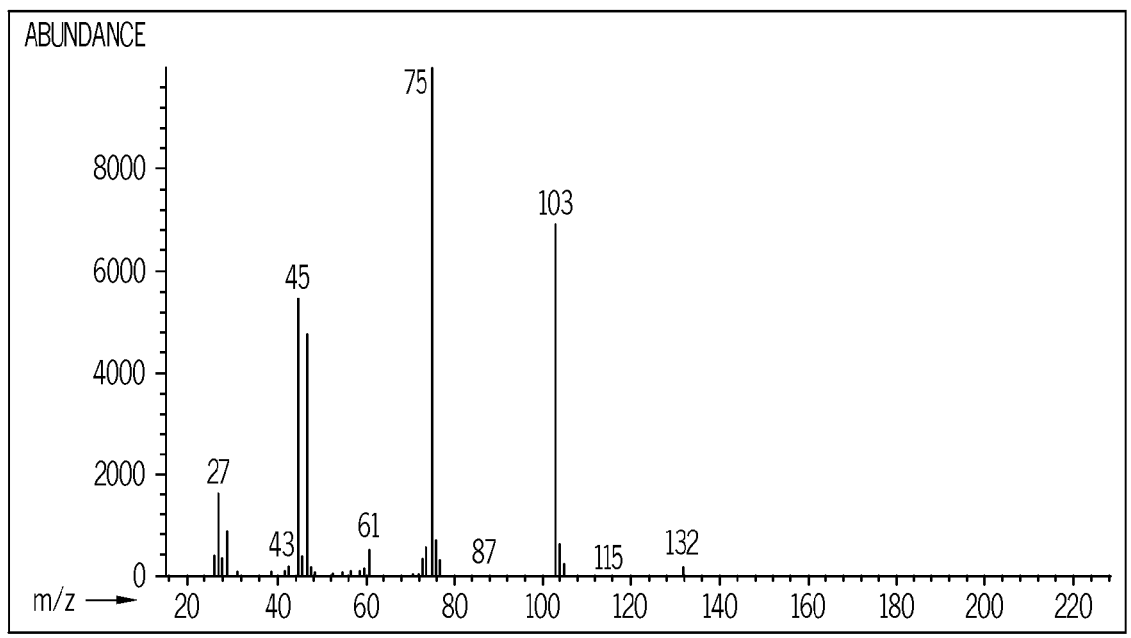
FIG. 2b is a library mass spectrum of triethylsilanol for comparison with the mass spectrum of FIG. 2.
Figure 3:
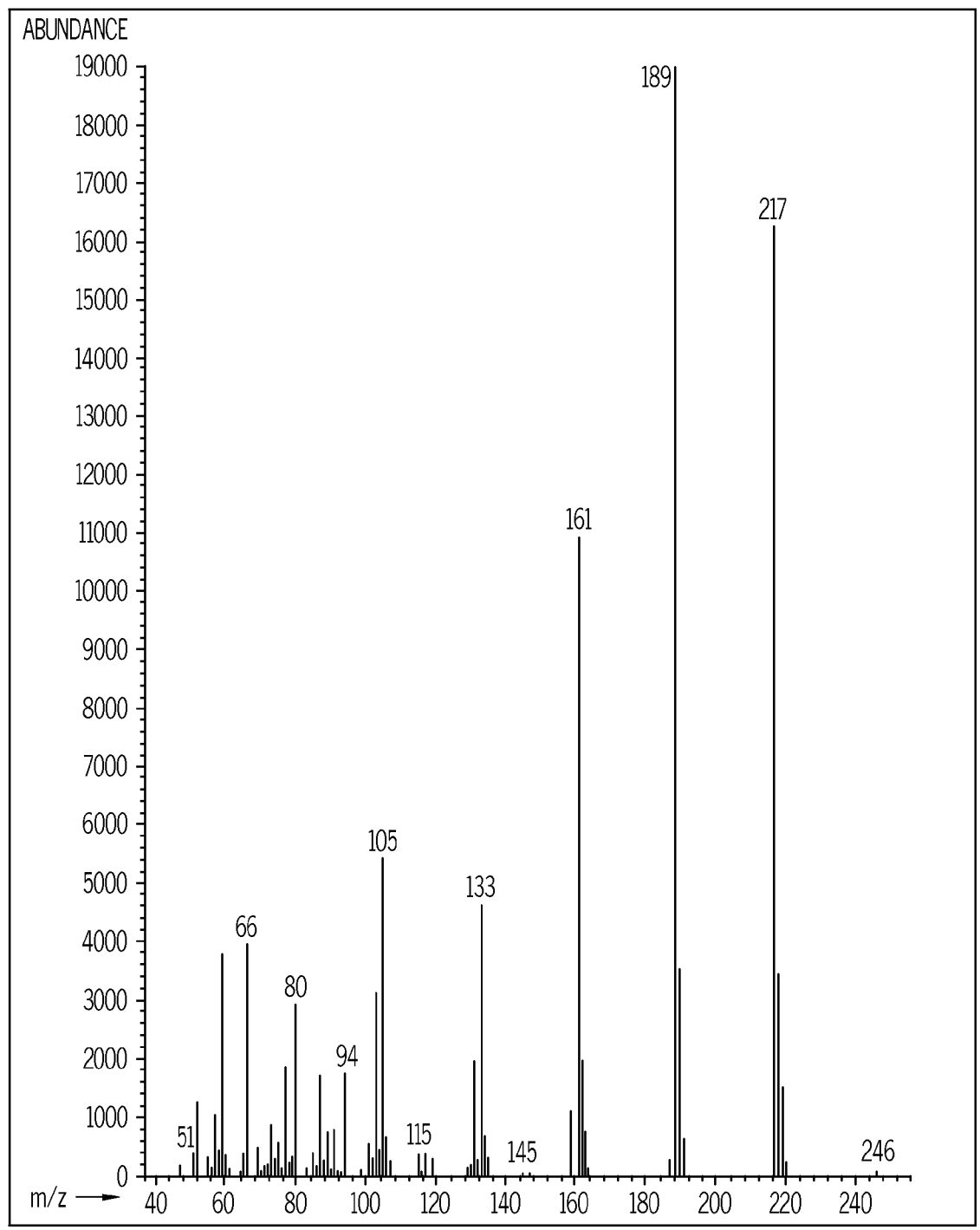
FIG. 3 is a mass spectrum of hexaethyldisiloxane obtained under GC/MS procedures in accordance with the present invention.
Figure 3A:
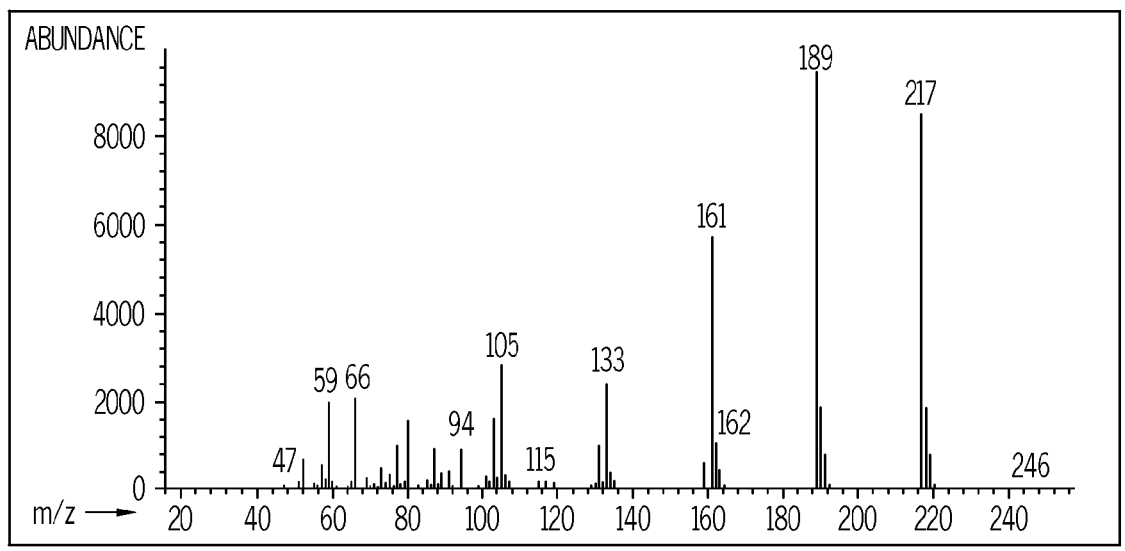
FIG. 3a is the mass spectrum of FIG. 3 reproduced in smaller scale for comparison to the library mass spectrum of hexaethyldisiloxane shown in FIG. 3b.
Figure 3B:
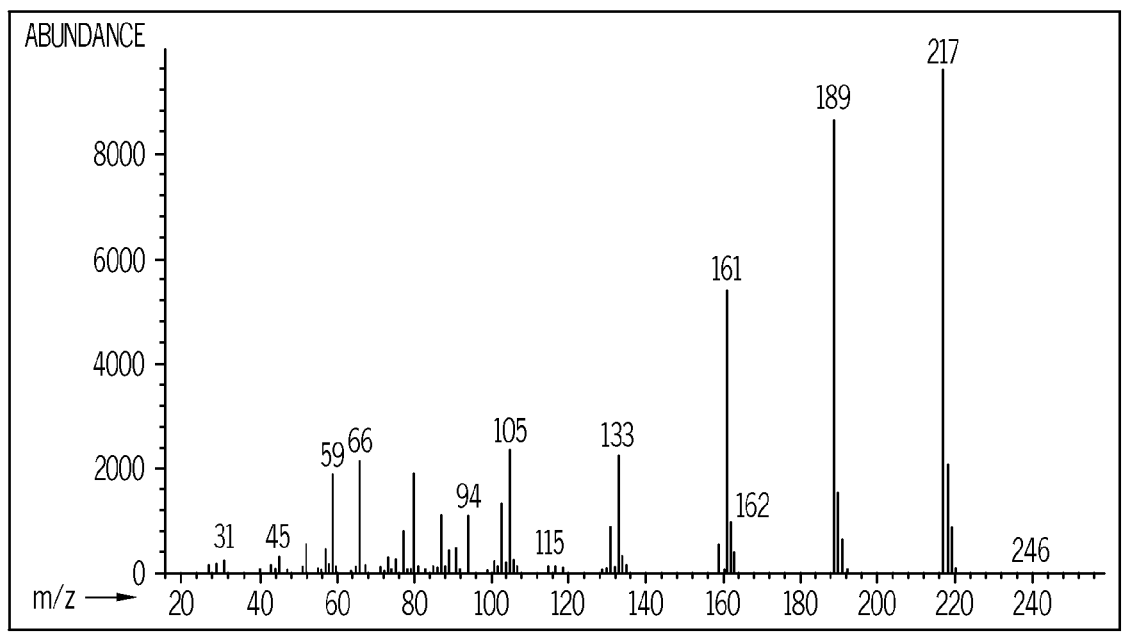
FIG. 3b is a library mass spectrum of hexaethyldisiloxane for comparison with the mass spectrum of FIG. 3a in accordance with the present invention.
Figure 4:
FIG. 4 depicts $^1H$ NMR spectrum of triethylsilane in accordance with the present invention.
Figure 5:
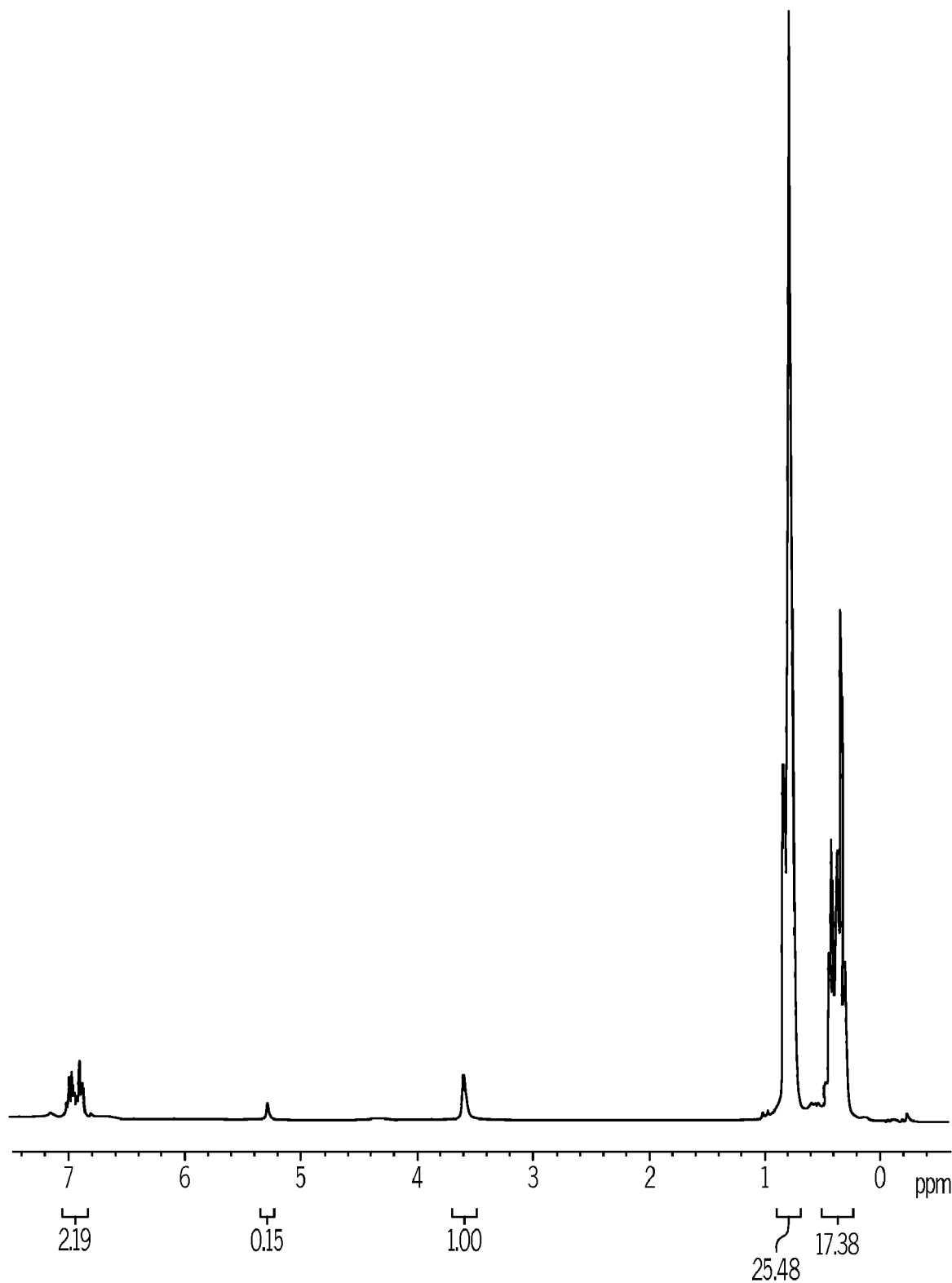
FIG. 5 depicts $^1H$ NMR spectrum of the products of a catalytic reaction of triethylsilane with water, namely, triethylsilanol and hexaethyldisiloxane in accordance with the present invention.
Figure 6:
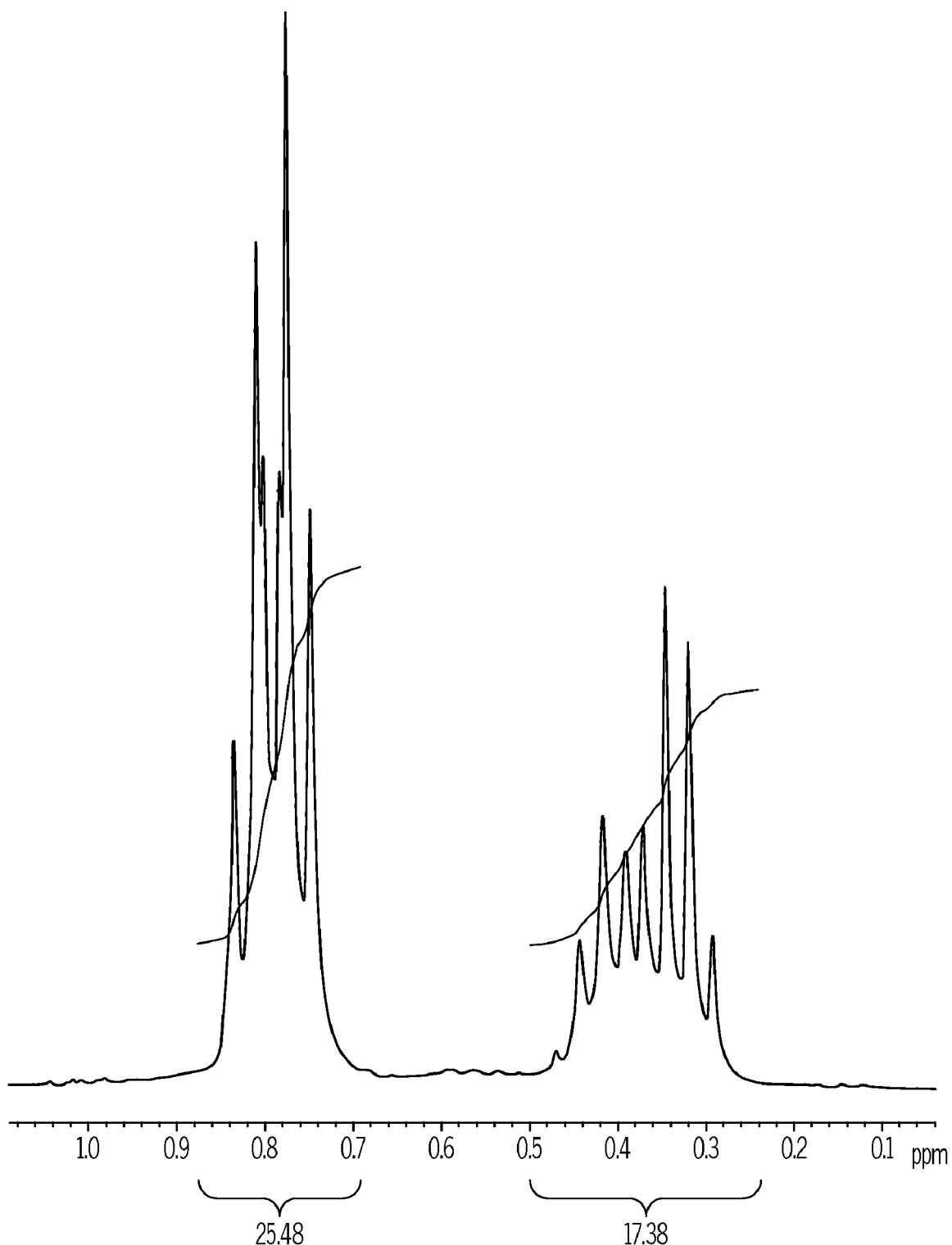
FIG. 6 depicts $^1H$ NMR spectrum of the products triethylsilanol and hexaethylsiloxane in accordance with the present invention.

Typical Procedure with Catalyst Generated In Situ, as Described Above $Et_3SiH$ (0.87 µL, 0.053 mmol) was added to a $CD_3CN$ solution of trityl tetra(pentafluorophenyl)borate (0.050 g, 0.053 mmol) in a resealable NMR tube. Re(O)Cl(hoz)$_2$ (0.030 g, 0.053 mmol) was then added and the NMR tube was sealed and removed from the glove box. The NMR tube was then opened to the atmosphere and $Et_3SiH$ (0.180 mL, 1.12 mmol) was added. Vigorous hydrogen evolution occurred upon the addition of the silane and the green catalyst solution quickly turned red. After the hydrogen evolution seized (15 minutes) an aliquot of this reaction was submitted for GC/MS (FIG. 1). Three peaks were found in the GC analysis; peak 1 had the highest abundance. The identity of the three peaks was determined by Mass Spectrometry and was found to be triethylsilanol (peak 1), hexaethyldisiloxane (peak 2) and triphenylmethane (peak 3, internal standard). The ratios of the peaks 1:2:3 by GC was 87:9:4. The mass spectra for peaks 1 and 2 are illustrated in FIGS. 2 and 3, respectively. NMR spectra of the starting triethylsilane and the catalytic reaction are depicted in FIGS. 4 and 5 respectively. The expanded alkyl region of FIG. 5, shown in FIG. 6, shows two sets of quartets and triplets in agreement with formation of triethylsilanol and hexaethylsiloxane. See FIGS. 2, 2a, 2b, 3, 3a, and 3b for reference spectra for triethylsilanol and hexaethylsiloxane. The silylether forms from the silanol and after a period of two hours the bulk of the silanol is converted to the ether.

Example 4

Catalytic Hydrolytic Oxidation of Et$_3$SiH and H$_2$ Production

Et$_3$SiH (0.87 µL, 0.053 mmol) was added to a CD$_3$CN solution of trityl tetra(pentafluorophenyl)borate (0.050 g, 0.053 mmol) in a resealable NMR tube. Re(O)Cl(hoz)$_2$ (0.030 g, 0.053 mmol) was then added and the NMR tube was sealed and removed from the glove box. The NMR tube was then opened to the atmosphere and Et$_3$SiH (0.200 mL, 1.25 mmol) and water (28.6 µL, 1.59 mmol) was added. Vigorous hydrogen evolution occurred upon the addition of the silane and the green catalyst solution remained green throughout the reaction. After the hydrogen evolution seized (15 minutes) an aliquot of this reaction was submitted for GC/MS. One peak was found in the GC analysis. The identity of the peak was determined by Mass Spectrometry and was found to be hexaethyldisiloxane. This is in agreement with formation of the silylether from the initial silanol product.

Example 5

Catalytic Hydrolytic Oxidation of PhMe$_2$SiH and H$_2$ Production

Typical Procedure with Isolated Catalyst

An acetonitrile solution of [Re(O)(hoz)$_2$][B(C$_6$F$_5$)] (0.050 g, 0.040 mmol) was treated with water (3 mL, 166 mmol) in a Schlenk tube. Phenyldimethyl silane (1 mL, 6.53 mmol) was then added and the evolution of hydrogen was monitored using a glass evolution apparatus. Upon cessation of hydrogen evolution the reaction mixture was poured onto ice and treated with pentane to precipitate the catalyst. The mixture was filtered and the organic layer was extracted with diethyl ether and pentane. The solution was dried with anhydrous MgSO$_4$ and filtered. Pentane and ether were removed in vacuo to afford 88% isolated yield of PhMe$_2$Si(OH) (95%) and (PhMe$_2$Si)$_2$O (5%).

Example 6

Hydrogen Yield of the Reaction of MePh$_2$SiH and H$_2$O

Figure 7:
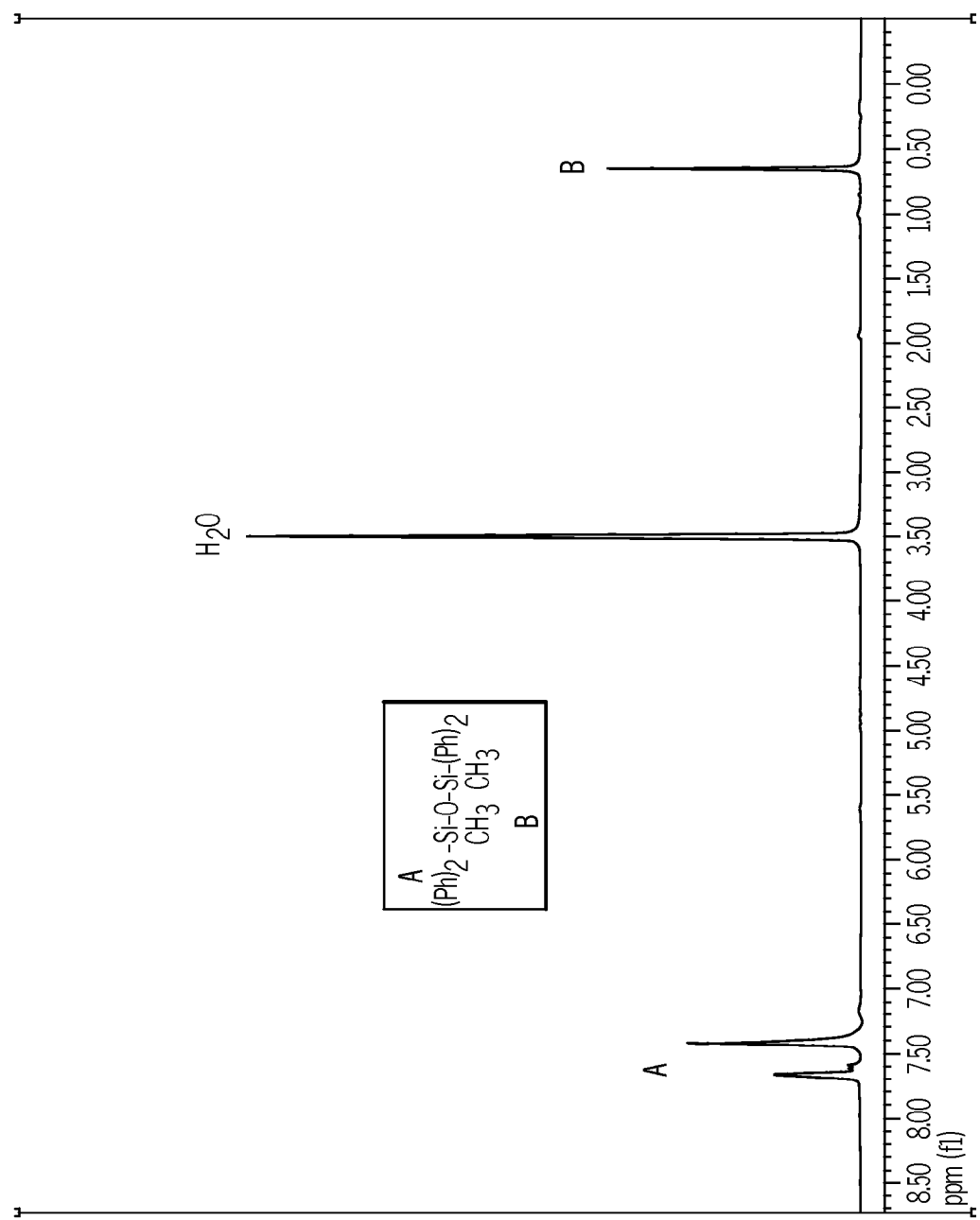
FIG. 7 depicts $^1H$ NMR spectrum of the reaction solution at the conclusion of $H_2$ evolution from the hydrolytic oxidation of methyldiphenylsilane with 1.0 mol % Re catalyst in accordance with the present invention.
Figure 13:
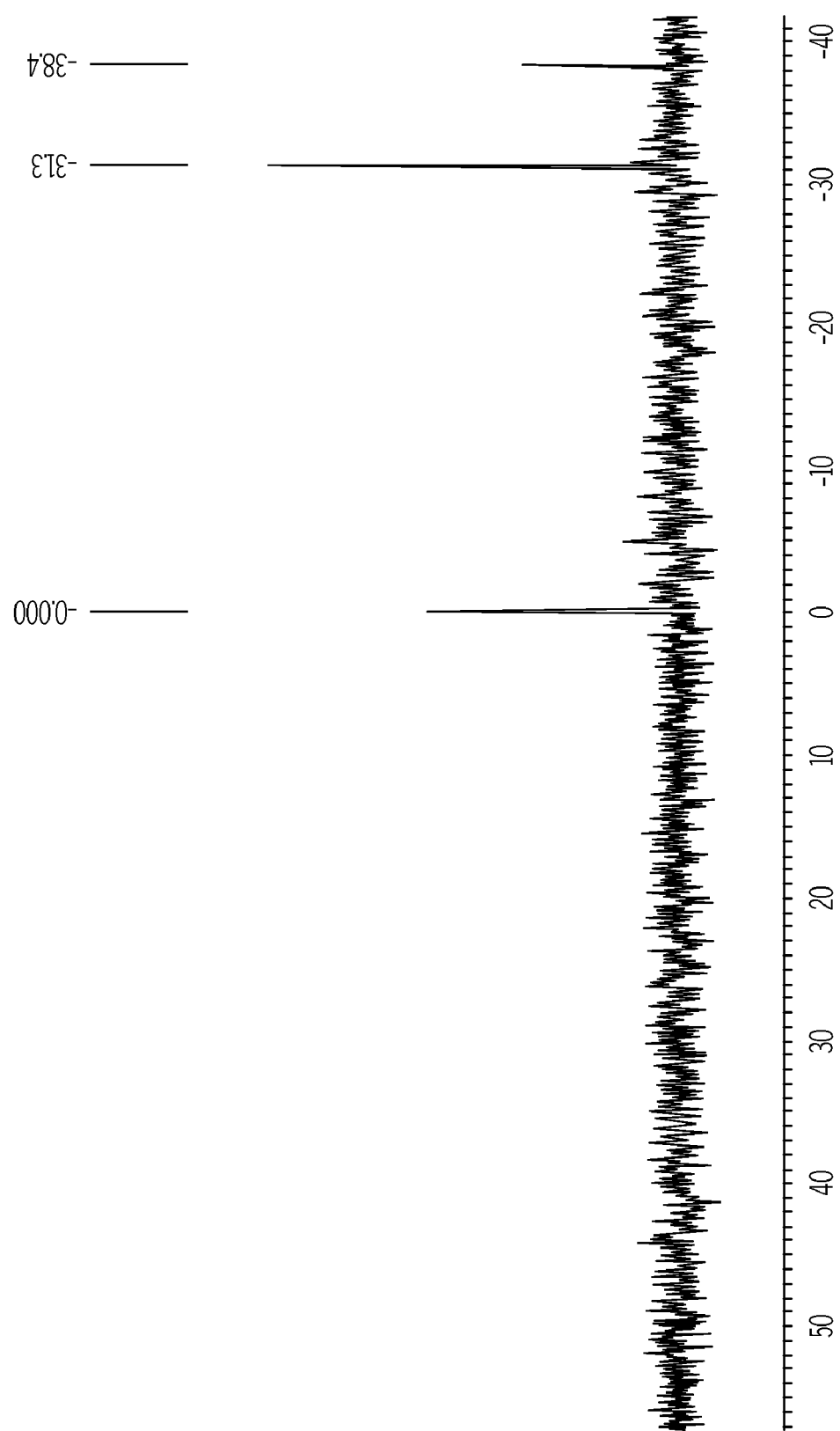
FIG. 13 depicts $^{29}Si$ NMR spectrum (in $CDCl_3$) for the reaction products of diphenylsilane ($Ph_2SiH_2$) and shows the diol $Ph_2Si(OH)_2$ (δ −31.3) and silanol $Ph_2SiH(OH)$ (δ −38.4). TMS was used as an internal reference (δ 0.00).

To a solution of 0.0080 g (0.0088 mmol) of trityl tetra (pentafluorophenyl)borate in CD$_3$CN (1 mL), 1.4 µL (0.0088 mmol) of triethylsilane was added. To this brown solution 0.0050 g (0.0088 mmol) of Re(O)Cl(hoz)$_2$ was dissolved producing a green solution. The reaction vessel was then charged with this solution and 0.079 mL (4.41 mmol) nanopure H$_2$O was injected through the silicone septum. To initiate the reaction, 0.175 mL (0.881 mmol) of methyldiphenylsilane (MePh$_2$SiH) was added and rapid H$_2$ evolution ensued. A total volume of 19±1 mL of evolved H$_2$ gas was measured (95% yield). The NMR spectrum of the final organic reaction product, siloxane, is depicted in FIG. 7. FIG. 13 shows the NMR spectrum of the final organic reaction product for a related reaction, using diphenylsilane (Ph$_2$SiH$_2$).

Example 7

Hydrogen Yield from the Reaction of Et$_3$SiH and Ethanol

Figure 8:
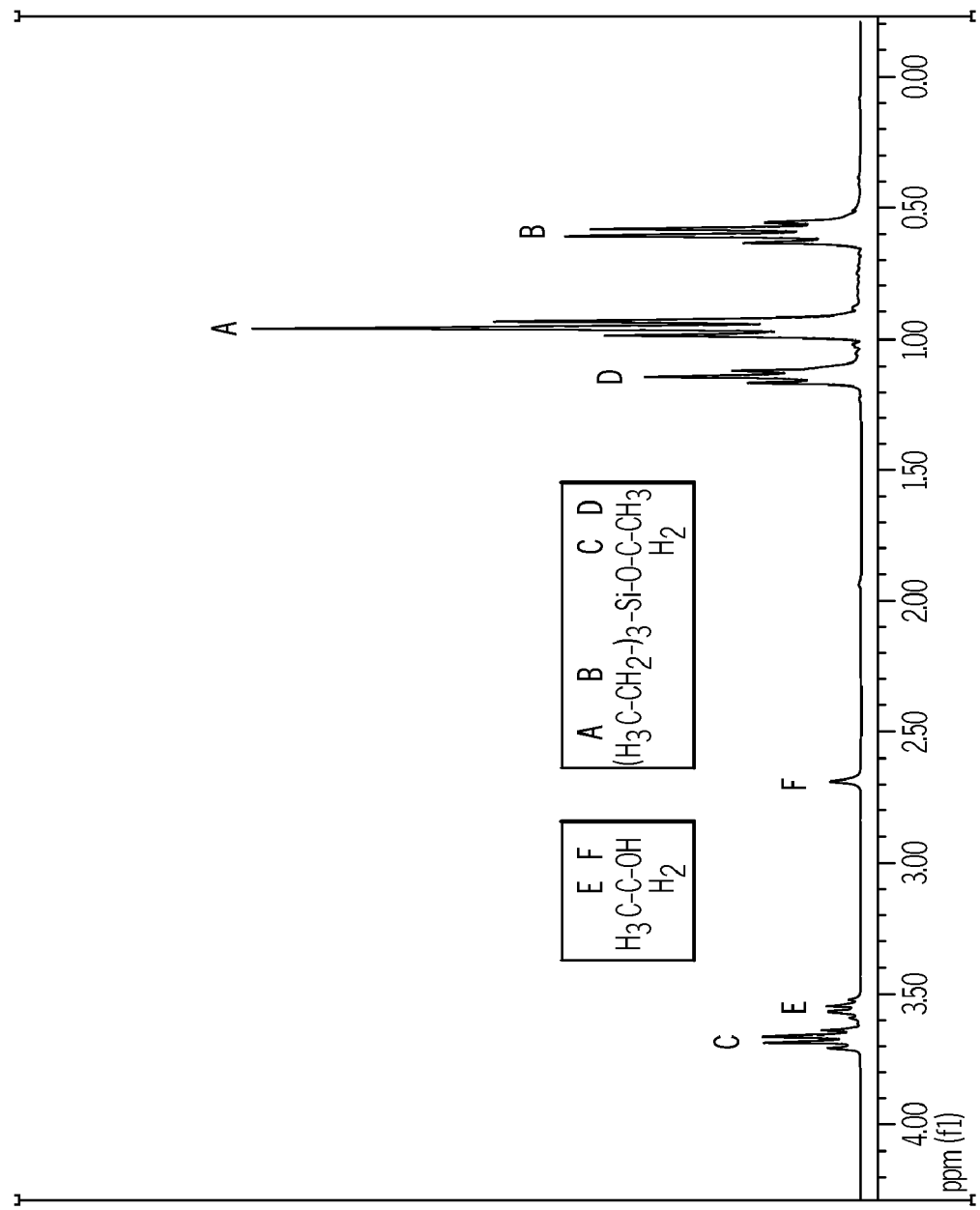
FIG. 8 depicts $^1H$ NMR spectrum of the reaction solution at the conclusion of $H_2$ evolution from the alchololysis of tri-ethylsilane with 1 mol % Re catalyst and EtOH in accordance with the present invention.
Figure 9:
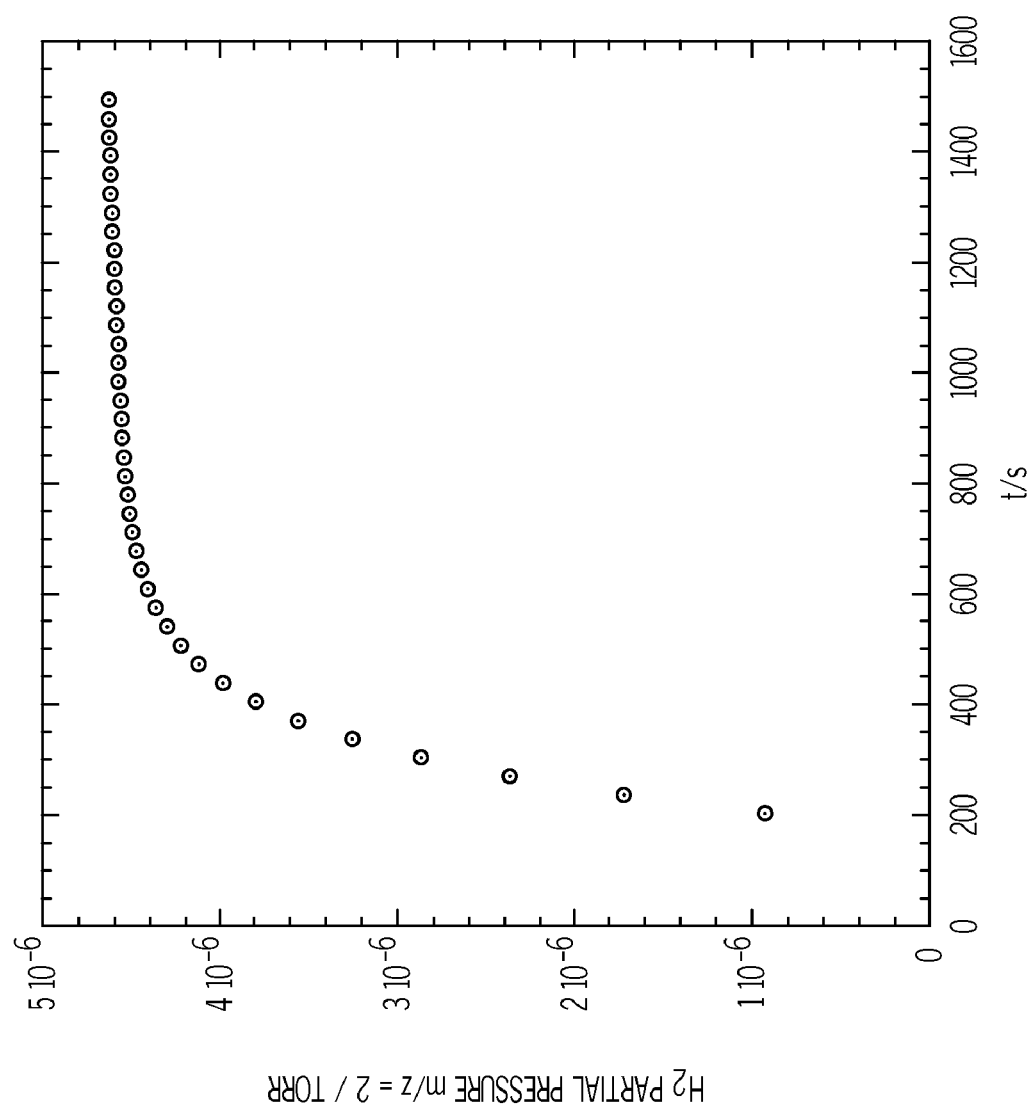
FIG. 9 depicts a time profile showing hydrogen evolution using electron impact mass spectrometry for the reaction of $Me_2EtSiH$ and water catalyzed by oxorhenium.

To a solution of 0.016 g (0.018 mmol) of trityl tetra(pentafluorophenyl)borate in CD$_3$CN (1 mL), 2.8 µL (0.018 mmol) of triethylsilane was added. To this brown solution 0.010 g (0.018 mmol) of Re(O)Cl(hoz)$_2$ was dissolved producing a green solution. The reaction vessel was then charged with this solution and 0.126 mL (2.16 mmol) ethanol (200 proof) was injected through the septum resulting in an intensely green solution. To initiate the reaction, 0.250 mL (1.57 mmol) of triethylsilane was added and rapid H$_2$ evolution ensued. A total volume of 34±1 mL of evolved H$_2$ gas was measured (96% yield). The NMR spectrum of the final organic reaction product, Et$_3$SiOEt, is given in FIG. 8.

Example 9

The Source of Oxygen in Silicon Product

To ascertain the source of oxygen in the silicon product, a catalytic reaction in open air with $^{18}$OH$_2$ in accordance with Equation 9, below, was conducted.

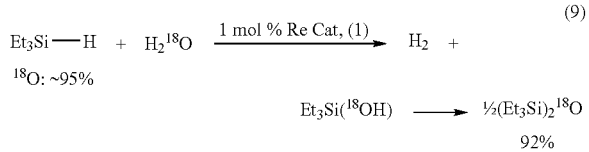

(9)

Figure 11A:
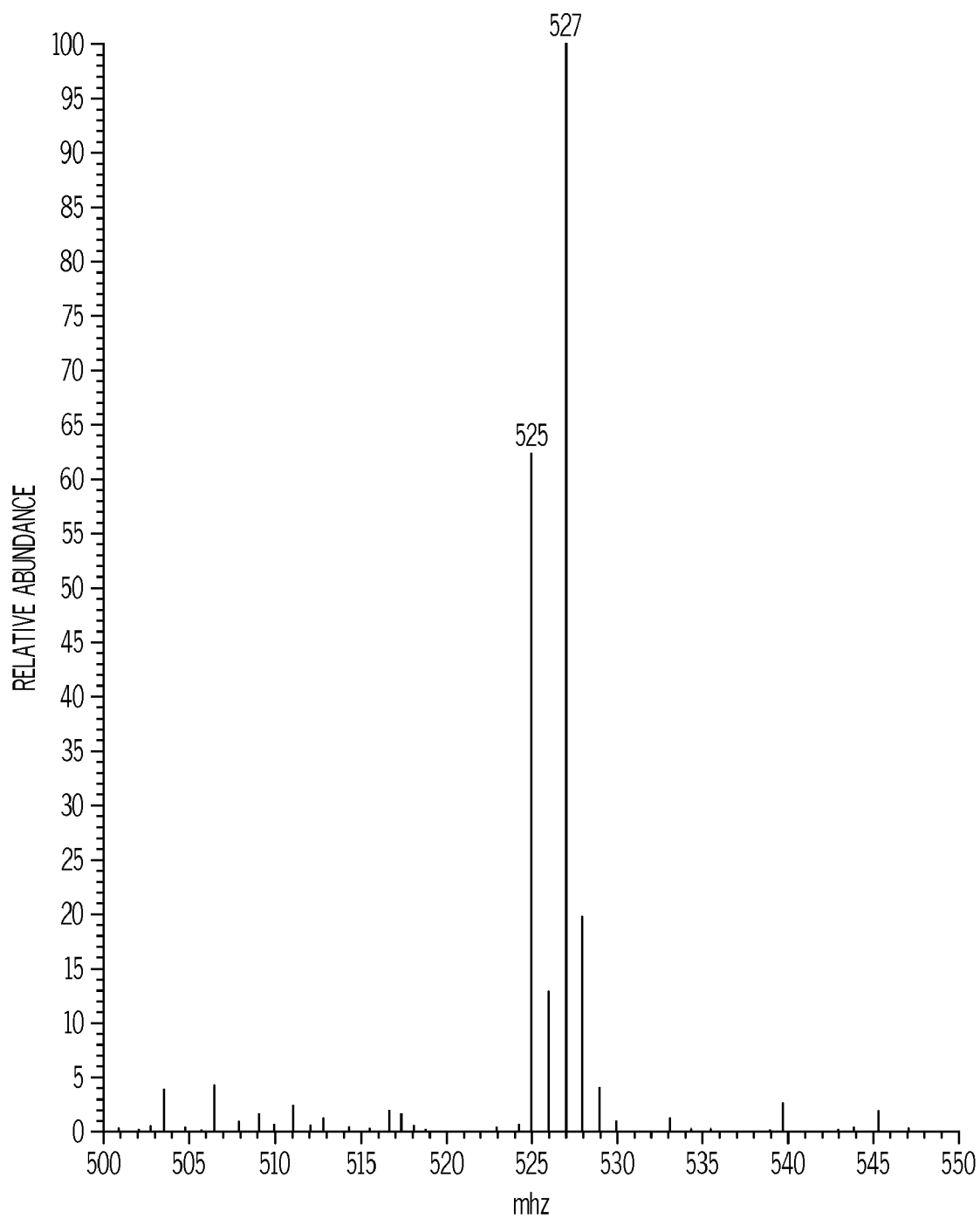
FIG. 11a depicts an MS-ESI$^+$ spectrum of $[Re(O)(hoz)_2]^+$.
Figure 11B:
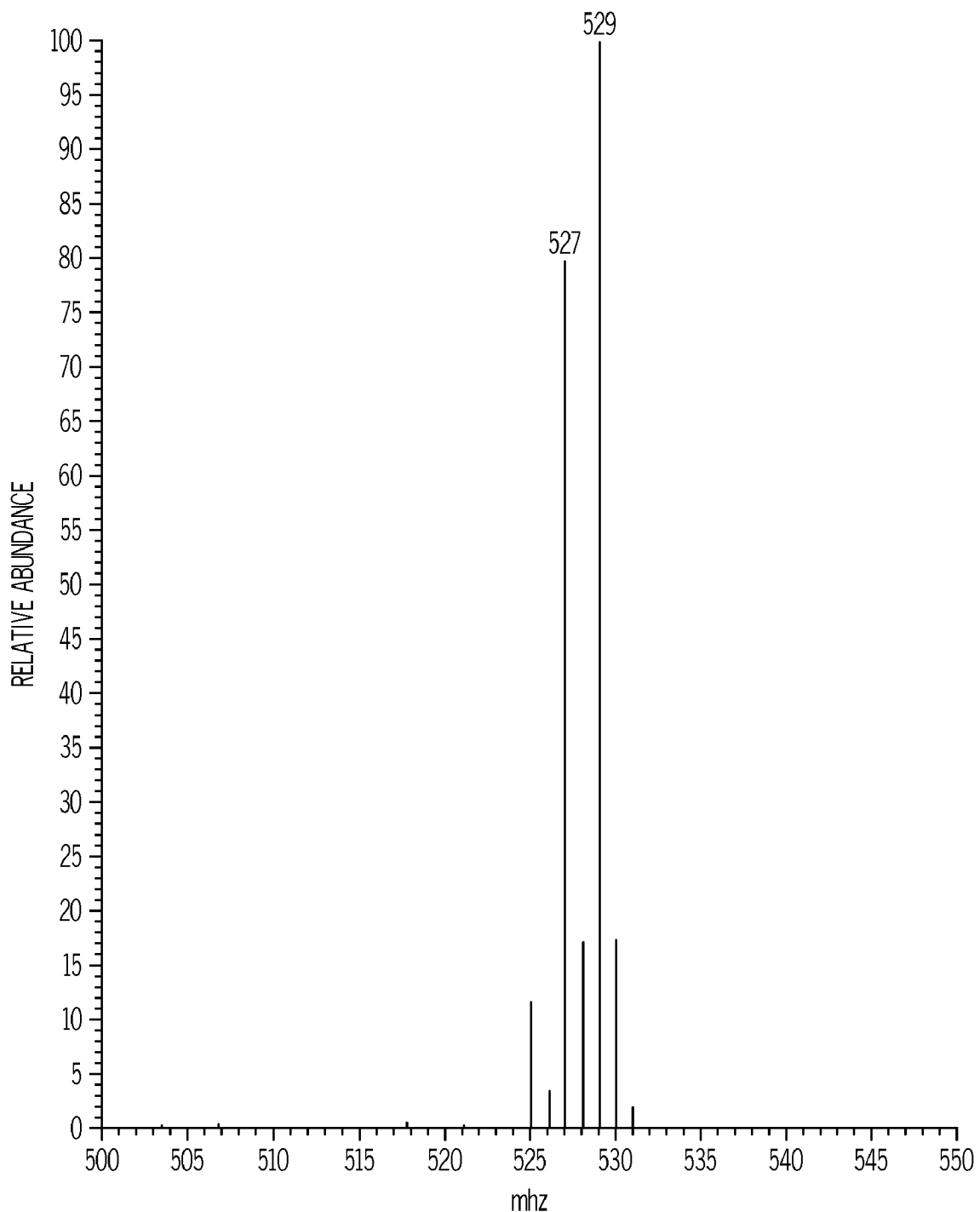
FIG. 11b depicts an MS-ESI$^+$ spectrum of $[Re^{18}O(hoz)_2]^+$ (84% $^{18}O$-enriched)

In a nitrogen-filled glove box trityl tetra(pentafluorophenyl) borate, (0.050 g, 0.053 mmol) was dissolved in 1 mL of CD$_3$CN and treated with Et$_3$SiH (8.7 µL, 0.053 mmol) to form the silylium cation. The brown solution was then treated with Re(O)(hoz)$_2$Cl (0.030 g, 0.053 mmol) and the green solution removed from the glove box. $^{18}$OH$_2$ (95% $^{18}$O, 30.0 µL, 1.66 mmol) was added to this solution and the solution stirred for 1 hour. Analysis by mass spectrometry (ESI) revealed [Re(O)(hoz)$_2$][B(C$_6$F$_5$)], as 84% $^{18}$O enriched. FIGS. 11*a* and 11*b* show the MS-ESI spectra for [Re(O)(hoz)$_2$][B(C$_6$F$_5$)] and $^{18}$O enriched [Re(O)(hoz)$_2$][B(C$_6$F$_5$)]. Preparation of the labeled water and catalyst were necessary to evaluate the mechanism of the hydrolytic oxidation. Quantitative $^{18}$O-enrichment was observed in the product, confirming water as the oxidant.

Example 10

Whether Silane Adds Across R═O Double Bond

To investigate whether silane adds across a Re═O multiple bond, two experiments were conducted.

Experiment 1

The first experiment was an isotope labeling experiment under stoichiometric conditions (Re/Ph$_2$MeSiH/H$_2$$^{18}$O=1:1:1) using a different order of substrate addition, as shown in Table 2, below.

TABLE 2

Results from Isotope Labeling Experiments with $^{18}OH_2{}^a$

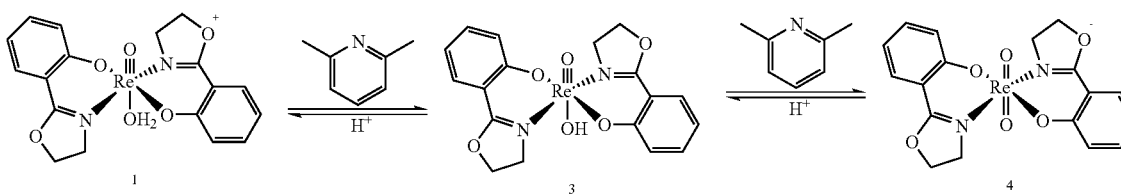

| entry | substrate added last | % $^{18}O^b$ | |
|---|---|---|---|
| | | $(Ph_2MeSi)_2O$ | 1 |
| 1 | Re cat. 1 | 86 | ~2 |
| 2 | $Ph_2MeSiH$ | 80 | 4 |
| 3 | $H_2{}^{18}O$ | 69 | $5^c$ |

$^a$Conditions: $[Ph_2MeSiH] = [1] = [H_2{}^{18}O]$ (~95% $^{18}O$) = 0.053 M in $CD_3CN$ at ambient temperature. Two substrates were incubated for 30 min prior to addition of the third.
$^{b18}O$-Incorporation into $(Ph_2MeSi)_2O$ was determined by GC-MS and into complex 1 by ESI-MS.
$^c[Re(hoz)_2]^+$ (m/z = 509.511) was detected in addition to 1.

Order 1—Rhenium Catalyst Added Last.

In a nitrogen-filled glove box trityl tetra(pentafluorophenyl) borate (0.050 g, 0.053 mmol) was dissolved in 1 mL of $CD_3CN$ and treated with $Ph_2MeSiH$ (10.6 μL, 0.053 mmol) to form the silylium cation. The brown solution was then treated with $Re(O)(hoz)_2Cl$ (0.030 g, 0.053 mmol) and the green solution removed from the glove box. Diphenylmethyl silane (10.6 μL, 0.053 mmol) was combined with $^{18}OH_2$ (1.1 μL, 0.053 mmol), and added to the catalyst solution. The resulting homogenous reaction mixture was allowed to stand for 30 minutes, passed through a plug of silica (benzene/hexanes), and collected fractions analyzed by GC/MS and ESI/MS.

Order 2—$Ph_2MeSiH$ Added Last.

In a nitrogen-filled glove box trityl tetra(pentafluorophenyl) borate (0.050 g, 0.053 mmol) was dissolved in 1 mL of $CD_3CN$ and treated with $Ph_2MeSiH$ (10.6 μL, 0.053 mmol) to form the silylium cation. The brown solution was treated with $Re(O)(hoz)_2Cl$ (0.030 g, 0.053 mmol) and the green solution removed from the glove box and treated with $^{18}OH_2$ (1.1 μL, 0.053 mmol) and allowed to stand for 30 minutes. Diphenylmethyl silane (10.6 μL, 0.053 mmol) was added to this solution. The resulting reaction mixture was allowed to stand for 15 minutes, passed through a plug of silica (benzene/hexanes), and collected fractions analyzed by GC/MS and ESI/MS.

Order 3—$^{18}OH_2$ Added Last.

Figure 12:
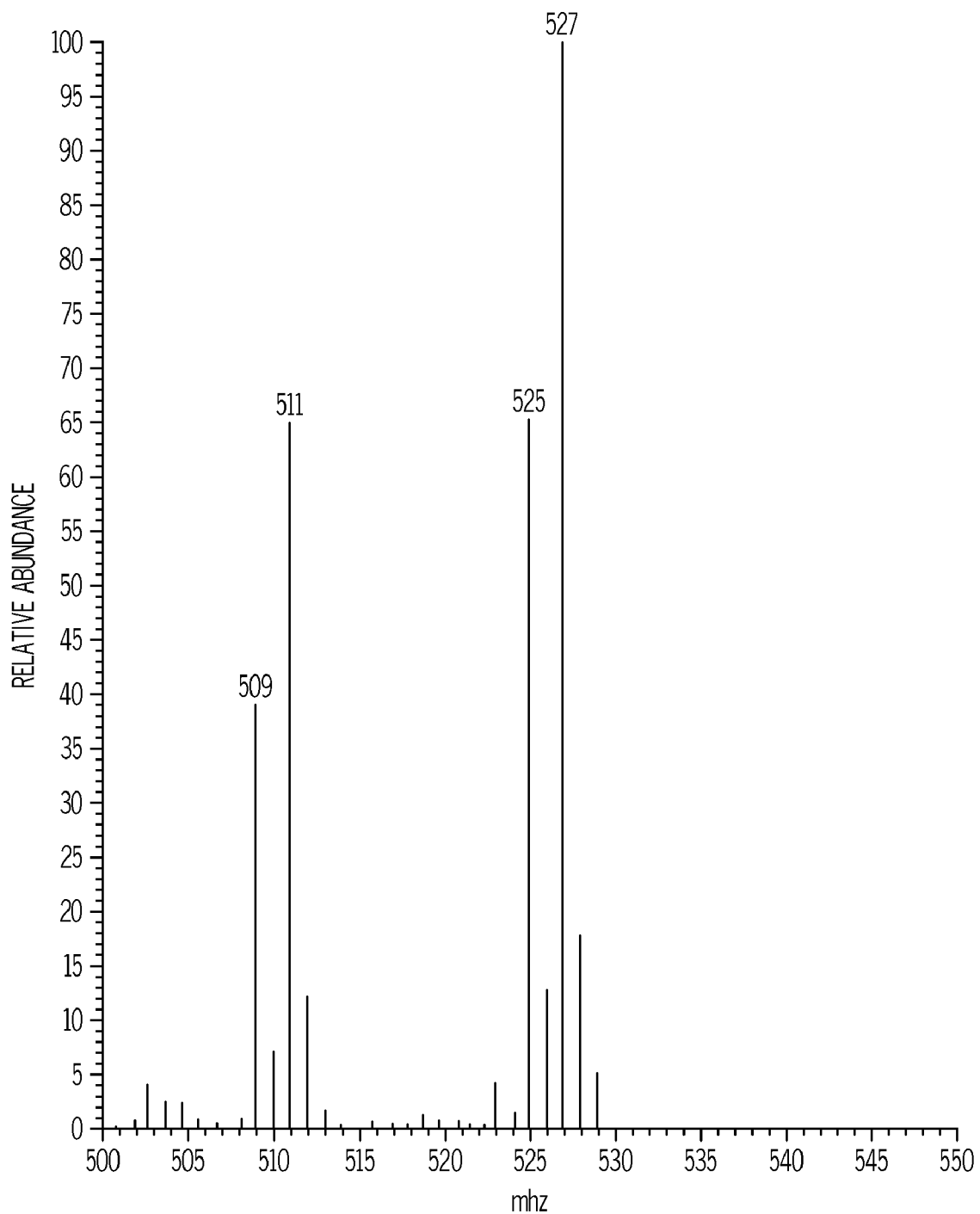
FIG. 12 depicts an MS-ESI$^+$ spectrum of an isotope labeling experiment with $^{18}OH_2$, showing both $[Re(O)(hoz)_2]+$ and reduced $[Re(hoz)^2]+$.

In a nitrogen-filled glove box, trityl tetra(pentafluorophenyl) borate (0.050 g, 0.053 mmol) was dissolved in 1 mL of $CD_3CN$ and treated with $Ph_2MeSiH$ (10.6 μL, 0.053 mmol) to form the silylium cation. The brown solution was then treated with $Re(O)(hoz)_2Cl$ (0.030 g, 0.053 mmol), the resulting green solution was treated with diphenylmethyl silane (10.6 μL, 0.053 mmol), and allowed to stand for 30 minutes during which the solution became red in color. The solution was removed from the glove box and treated with $^{18}OH_2$ (1.1 μL, 0.053 mmol), allowed to stand for 15 minutes, passed through a silica plug (benzene/hexanes), and recovered fractions analyzed by GC/MS and ESI/MS. This procedure afforded the least $^{18}O$ enrichment, probably due to reduction of the rhenium catalyst by the $Ph_2MeSiH$ prior to the addition of $^{18}OH_2$. FIG. 12 depicts an MS-ESI spectrum indicating the presence of reduced $[Re(hoz)_2]^+$.

The slightly reduced $^{18}O$-enrichment in the silyl ether product is due to oxo exchange between $H_2{}^{18}O$ and the Rhenium Catalyst (see FIGS. 11a and 11b) and the minor side reduction of the Rhenium Catalyst by $Ph_2MeSiH$. It is notable that adding the silane last after incubation of the Rhenium Catalyst and $H_2{}^{18}O$ afforded less enrichment (compare entry 1 and entry 2 in Table 2). Addition of water last (entry 3 in Table 2) gave the least enrichment because incubation of the Rhenium Catalyst and $Ph_2MeSiH$ prior to water addition resulted in reduction of some of the rhenium catalyst (FIG. 12).

Experiment 2

The second experiment tested base catalysis by employing a hindered noncoordinating base, 2,6-lutidene, which shifts the acid/base equilibria in favor of dioxorhenium (eq. 10). Thus, if 4 is the active form, 2,6-lutidene would promote catalysis. On the contrary, it was found that addition of base shuts down the catalytic reaction completely. Therefore, it was concluded that 4 is not the active catalyst, and a second multiply bonded ligand is not needed, contrary to a previous report.

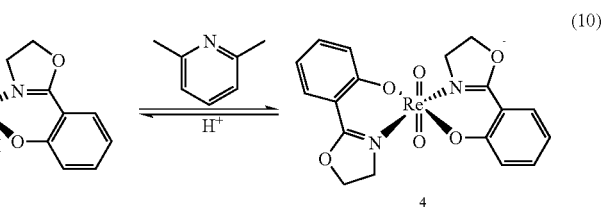

(10)

The source of each hydrogen atom in the dihydrogen product was discerned by employing $Et_3Si$-D with $H_2O$, and $Et_3Si$—H with $D_2O$ (eqs 11 and 12). The produced hydrogen gas was analyzed by mass spectrometry and found to be exclusively HD.

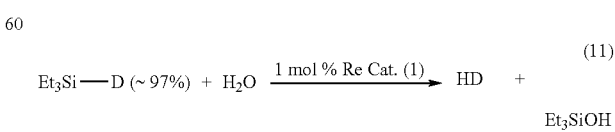

(11)

gas analysis: $H_2$ = 5.6%, HD = 94.2% and $D_2$ = 0.2%

-continued

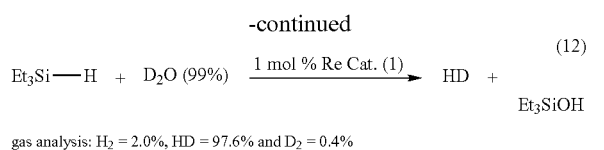

(12)

gas analysis: $H_2 = 2.0\%$, $HD = 97.6\%$ and $D_2 = 0.4\%$

Figure 10:
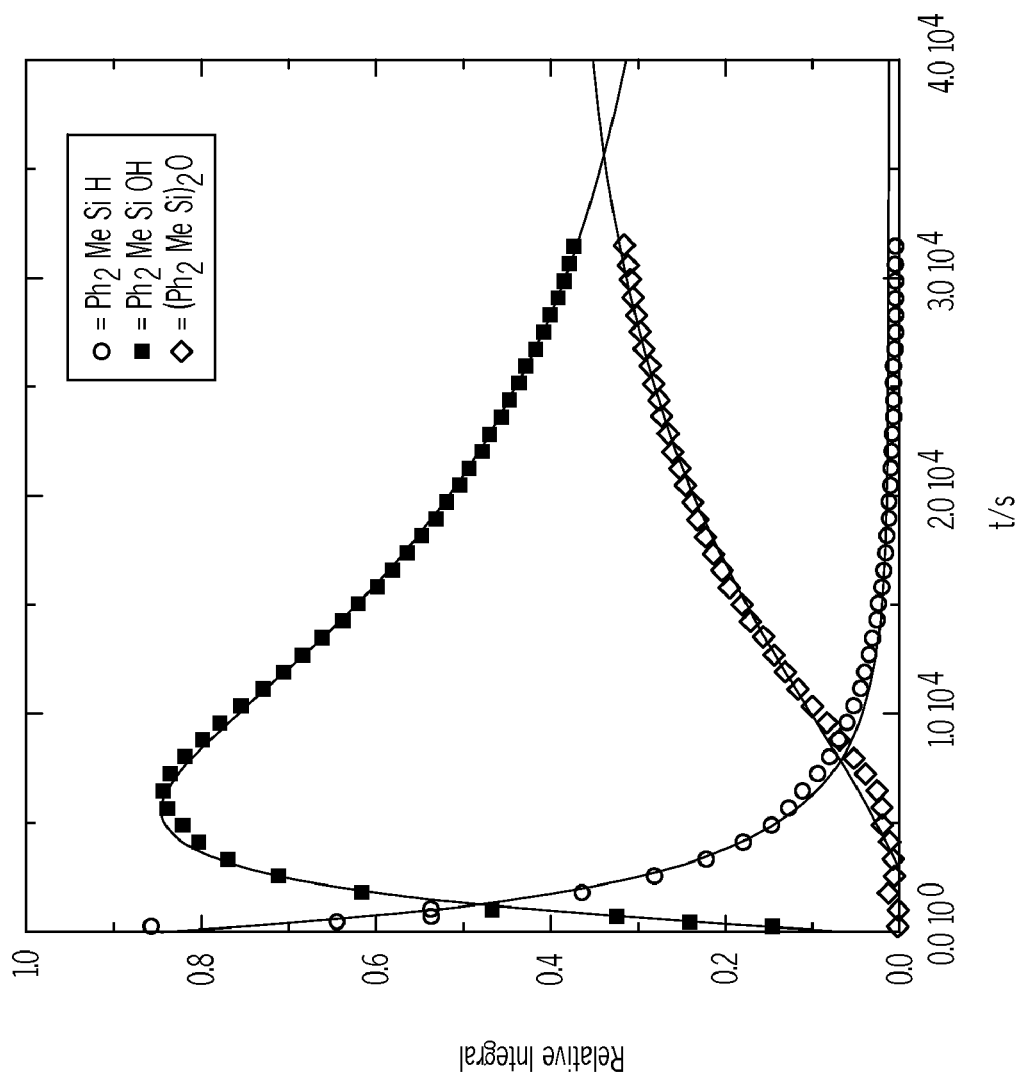
FIG. 10 depicts a typical kinetic profile obtained by $^1H$ NMR spectrum for oxorhenium catalyzed hydrolytic oxidation of organosilanes.

The progress of reaction was investigated by $^1H$ NMR for $Ph_2MeSiH$ (FIG. 10). The rate of formation of silanol is first-order in $[Ph_2MeSiH]$, $[Re]_T$, and $[H_2O]$. The rate of silyl ether formation is first-order in $[Ph_2MeSiOH]$ and $[Re]$, but inhibited by water. Again without wishing to be tied to any specific theory, a mechanism that is consistent with the observed isotope labeling and kinetic experiments is given in Scheme 1.

Surprisingly, the results of these experiments indicated that, contrary to previous reports on the mechanism of oxosilation using alternate Rhenium Catalysts (such as $[Re(O)_2][(PPh_3)_2]$) and early transition metals, two multiply bonded ligands are not required for the rhenium catalyst to promote the hydrolytic oxidation of organosilanes. See Kennedy-Smith, J. J.; Nolin, K. A.; Guneterman, H. P.; Toste, F. D., *J. Am. Chem. Soc.* 2003, vol. 125, p. 4056; Sweeney, Z. K.; Polse, J. L.; Andersen, R. A.; Bergman, R. G.; Kubinec, M. G., *J. Am. Chem. Soc.* 1997, vol. 119, p. 4543; and, Gountchev, T. I.; Tilley, T. D., *J. Am. Chem. Soc.* 1997, vol. 119, p. 12831. The rhenium catalyst disclosed herein does not necessarily require two oxygen atoms doubly bonded to the Rhenium atom of the catalyst molecule, which were previously believed necessary for this sort of reaction.

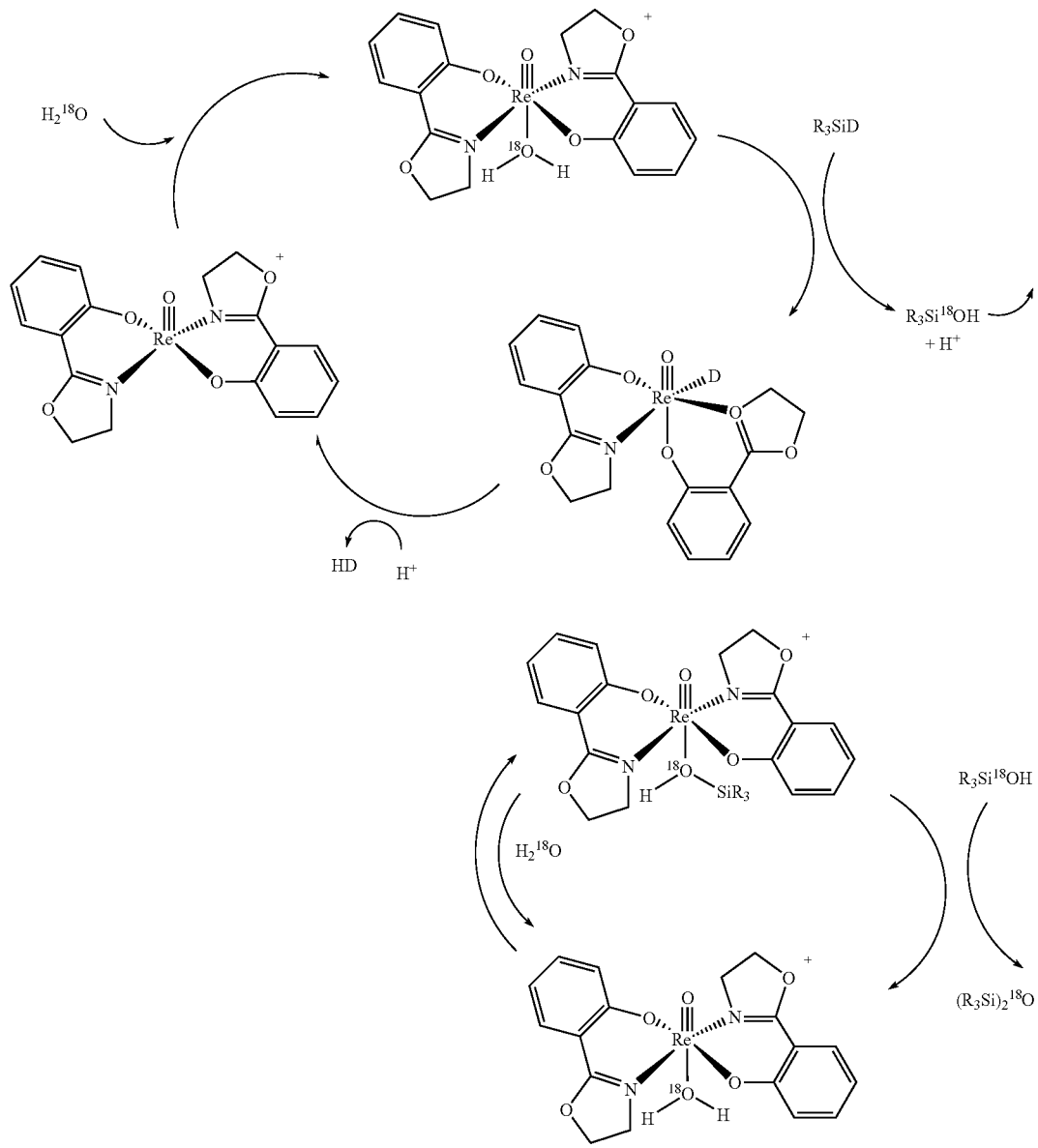

While exemplary embodiments incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for producing hydrogen gas, comprising:
   providing a silane compound; and
   reacting the silane compound with a catalyst comprising an oxorhenium (V) coordination complex to produce hydrogen gas, the catalyst being present in an amount of from about 0.01 to about 0.1 mol percent and including a ligand selected from the group consisting of phenoxide, oxazoline, bisoxazoline, diamidato and Schiff base ligands.

2. The process of claim 1, wherein the silane compound has the formula $R_{4-x}Si—H_x$, wherein R comprises an alkyl or aryl group and the value of x is 1, 2 or 3.

3. The process of claim 2, wherein the silane compound is reacted with water and produces a byproduct of the formula $R_{4-x}Si(OH)_x$.

4. The process of claim 2, wherein the silane compound is reacted with an alcohol of the formula xR'OH and produces a byproduct of the formula $R_{4-x}SiOR'_x$, wherein R' comprises an alkyl or aryl group.

5. The process of claim 2, wherein R is selected from the group consisting of ethyl, methyl and phenyl.

6. The process of claim 2 wherein the value of x is 3.

7. The process of claim 1, wherein the catalyst comprises $[Re(O)(C_9NO_2H_8)_2]^+$ and an anion.

8. The process of claim 7, wherein the anion is $B(C_6F_5)_4^-$.

9. The process of claim 1, wherein the silane compound is selected from the group consisting of polysilyl silanes, tertiary silanes, primary silanes and secondary silanes.

10. The process of claim 1, wherein the silane compound is selected from the group consisting of alkylsilanes, arylsilanes and phenylsilanes.

11. The process of claim 1, wherein the catalyst is ionic.

12. The process of claim 1, further comprising the step of reacting the silane compound with a solvent.

13. The process of claim 12, wherein the solvent is selected from the group consisting of acetonitriles, benzenes and dichloromethanes.

14. The process of claim 1, further comprising the step of reacting the silane compound with water.

15. The process of claim 14, wherein the yield of hydrogen is proportional to the water stoichiometry.

16. The process of claim 1, further comprising the step of reacting the silane compound with alcohol.

17. The process of claim 1, wherein the process proceeds at ambient conditions.

18. The process of claim 1, further comprising producing organic silicon byproducts.

19. The process of claim 1, further comprising preparing the catalyst from a chloride precursor of the formula $Re(O)(hoz)_2Cl$.

20. A process for producing hydrogen gas, comprising:
   providing a silane compound selected from the group consisting of primary, secondary, tertiary and polysilyl silanes;
   oxidizing the silane compound with water or alcohol; and
   catalyzing the oxidation with about 0.01 to about 0.1 mol percent of a catalyst comprising an oxorhenium (V) oxazoline complex and a ligand selected from the group consisting of phenoxide, oxazoline, bisoxazoline, diamidato and Scuff base ligands;
   wherein hydrogen gas and a silane byproduct are produced.

21. The process of claim 20, wherein the silane compound has the formula $R_{4-x}Si—H_x$, wherein R comprises an alkyl or aryl group and the value of x is 1, 2 or 3.

22. The process of claim 21, wherein R is selected from the group consisting of ethyl, methyl and phenyl.

23. The process of claim 20, wherein the silane compound is oxidized with water.

24. The process of claim 20, wherein the silane compound is oxidized with an alcohol.

25. The process of claim 20, wherein the yield of hydrogen is proportional to the water stoichiometry.

26. The process of claim 20, wherein the process proceeds at ambient conditions.

27. The process of claim 20, further comprising producing organic silicon byproducts.

28. The process of claim 20, further comprising preparing the catalyst from a chloride precursor of the formula $Re(O)(hoz)_2Cl$.

29. The process of claim 20, wherein the silane byproduct comprises one of a silanediol and silanetriol.

* * * * *